US012794926B1

(12) United States Patent
Zavalkovsky et al.

(10) Patent No.: US 12,794,926 B1

(45) Date of Patent: Nov. 10, 2026

(54) SYSTEM AND METHOD FOR CHARACTERIZING CLOUD-BASED ATTACKS ON USERS

(71) Applicant: Proofpoint, Inc., Sunnyvale, CA (US)

(72) Inventors: Arthur Zavalkovsky, Netanya (IL); Meidan Kronenfeld, Rishon Lezion (IL); Roie Cohen-duwek, Tel Aviv (IL); Stanislav Silberberg, Haifa (IL)

( * ) Notice: Subject to any disclaimer, the term of this patent is extended or adjusted under 35 U.S.C. 154(b) by 267 days.

(21) Appl. No.: 18/128,676

(22) Filed: Mar. 30, 2023

Related U.S. Application Data

(60) Provisional application No. 63/325,794, filed on Mar. 31, 2022.

(51) Int. Cl.
*H04L 9/40* (2022.01)

(52) U.S. Cl.
CPC ...... *H04L 63/1433* (2013.01); *H04L 63/1416* (2013.01); *H04L 63/1441* (2013.01)

(58) Field of Classification Search
CPC ............. H04L 63/1433; H04L 63/1441; H04L 63/1416
See application file for complete search history.

(56) References Cited

U.S. PATENT DOCUMENTS 11,831,670 B1* 11/2023 Molls .................. H04L 63/1441
11,956,255 B1* 4/2024 Holub .................... G06N 20/00
12,445,458 B1* 10/2025 Thompson .......... H04L 63/1416
2017/0078322 A1* 3/2017 Seiver ................... H04L 63/101
2017/0257376 A1* 9/2017 Dulkin .................... H04L 63/08
2017/0359220 A1* 12/2017 Weith ...................... G06F 16/23
2018/0004948 A1* 1/2018 Martin ................ H04L 63/1425
2018/0167402 A1* 6/2018 Scheidler ............... G06N 20/00
2018/0234435 A1* 8/2018 Cohen ................. H04L 63/1416
2019/0036958 A1* 1/2019 Shi ....................... H04L 63/1466
2019/0068627 A1* 2/2019 Thampy .............. H04L 63/1425
2019/0098037 A1* 3/2019 Shenoy, Jr. ......... H04L 63/1441
2019/0356679 A1* 11/2019 Sites ................... H04L 63/1416
2019/0387017 A1* 12/2019 Martynenko ......... G06F 21/552
2020/0177614 A1* 6/2020 Burns ................... G06F 21/577
(Continued)

OTHER PUBLICATIONS

Torkura, Kennedy A.; Sukmana, Muhammad, I.H.; Strauss, Tim; Graupner, Hendrik; Cheng, Feng; Meinel, Christoph; "CSBAuditor: Proactive Security Risk Analysis for Cloud Storage Broker Systems," 17th International Symposium on Network Computing and Applications (NCA), Cambridge, MA, USA, Nov. 1-3, 2018, IEEE, 10 pages.*

(Continued)

*Primary Examiner* — Victor Lesniewski

(57) ABSTRACT

Embodiments are directed to systems, apparatuses, and methods for more effectively preparing for and responding to cybersecurity threats directed at a cloud-based platform. In some embodiments, this is achieved by determining or generating a cloud attack index (CAI) for each of a set of accounts. In one embodiment, the CAI is a function of the potential severity (i.e., harm) resulting from a specific type of attack and the confidence level in a system detecting such an attack (for example, by correctly determining that an attack is of the type identified). In one embodiment, the CAI is a sum of terms, with each term representing a product of the potential severity and the confidence level for a date within a range between a first date and a second date.

20 Claims, 10 Drawing Sheets

(56) References Cited

U.S. PATENT DOCUMENTS

| | | | | |
|---|---|---|---|---|
| 2021/0021636 | A1* | 1/2021 | Sbandi | G06N 3/09 |
| 2021/0126938 | A1* | 4/2021 | Trost | G06F 21/552 |
| 2021/0218765 | A1* | 7/2021 | Rodriguez Bravo | H04L 63/1433 |
| 2021/0273957 | A1* | 9/2021 | Boyer | G06F 21/554 |
| 2021/0360032 | A1* | 11/2021 | Crabtree | H04L 63/1441 |
| 2022/0272118 | A1* | 8/2022 | Trivellato | H04L 63/1433 |
| 2023/0171270 | A1* | 6/2023 | Venugopal | H04L 63/145 726/22 |

OTHER PUBLICATIONS

Ahmadi, Vida; Arlos, Patrik; Casalicchio, Emiliano; "Normalization Framework for Vulnerability Risk Management in Cloud," 8th International Conference on Future Internet of Things and Cloud (FiCloud), Rome, Italy, Aug. 23-25, 2021, IEEE, pp. 99-106.*

* cited by examiner

| Types of Attacks | Severity |
|---|---|
| **APT**<br>Suspicious login attempts from IPs within the organization | 9 |
| **Lateral Movement**<br>Malicious emails originated from within the organization | 7 |
| **Collaboration attacks**<br>Attacks which leverage collaboration platforms (e.g., SharePoint, OneDrive) | 4 |
| **Cloud Malware Phish**<br>Malware carrying email followed by suspicious login attempts | 3 |
| **Cloud Phishing**<br>Phishing email followed by suspicious login attempts | 3 |
| **Brute-force**<br>Brute-force attack on cloud account | 1 |

Figure 2(a)

$$\text{CAI}=\sum_{Date1}^{Date2} Severity(attack) * Confidence(detection)$$

Figure 2(b)

Score Table (mapping d → s_d):

| **Detector** | **Score Multiplier** (based on severity and confidence) |
|---|---|
| Brute Force V1 | 1 |
| Brute Force V2 | 1 |
| Brut Force V2.2 | 1 |
| TOR node | 1.2 |
| TFTT (too fast to travel) | 1.4 |
| BRC (Bad reputation country) | 1.6 |
| TAP correlation | 3 |

Figure 2(c)

Formula:

$$CAI(U)_{V1} = \sum_{d \in D} s_d * \log(1 + n_d)$$

$$n_d = \begin{cases} number\ of\ sus\ logins, & d \neq tap \\ number\ of\ days\ w.sus\ logins, & d = tap \end{cases}$$

Where:

- $U$ is a user.
- $d$ is a detector from a set of detectors $D$.
- $s_d$ is the score multiplier of the detector $d$.

Figure 2(d)

SYSTEM AND METHOD FOR CHARACTERIZING CLOUD-BASED ATTACKS ON USERS

CROSS REFERENCE TO RELATED APPLICATION

This application claims the benefit of U.S. Provisional Application No. 63/325,794, filed Mar. 31, 2022, and titled "System and Method for Characterizing Cloud-Based Attacks on Users", the contents of which is incorporated in its entirety (including the Appendix) by this reference.

BACKGROUND

Cybersecurity (also sometimes referred to as computer security or information technology (IT) security) relates to the protection of computer systems, computing devices, and networks from the theft of, or damage to, hardware, software, or electronic data, as well as from the disruption or misdirection of the services they provide. The data may include proprietary information, payment information, or personal information, and may be of interest to foreign state actors, competitors, or those seeking to commit fraud via identify theft.

While personal computing devices and servers located behind firewalls were formerly the primary "targets" of malicious actors, with the development and acceptance of "cloud-based" services, the set of targets has now expanded to include networks and remotely located servers used as part of a multi-tenant system or Software-as-a-Service platform. These remote servers are connected by one or more networks (e.g., wired, wireless, dedicated, etc.) to users who access data stored remotely or add data to remotely located data storage components. Users may also instruct processors in the servers to perform specified operations on the data.

Over time, the combination of a greater number of users, greater amounts of potentially valuable data and information, and an increase in the potential entry points and possible attack methods for a malicious actor to use have contributed to an increased cybersecurity threat. This increased threat or degree of cybersecurity risk has been responded to with the conventional tools available to security/IT analysts, where these tools are those associated with detecting and responding to threats that could result in unauthorized access to, or disruption of, assets such as computers, servers, or networks. However, these conventional tools are of limited value in addressing cybersecurity risks in the changing threat environment and when addressing threats to the increased types and numbers of potential targets.

One area of potential vulnerability to a cyber-attack is that arising from attacks or attempted attacks on cloud-based resources. These attacks can be initiated to disrupt the operation of a cloud platform and interfere with the delivery of a service (such as access to an application or to data processing and storage services). They can also be initiated to disrupt users and organizations whose accounts become compromised.

Attacks targeted at a cloud-based system or service use the system or service as the entry point or "vector" for delivering the cyber-threat and obtaining unauthorized access to data, information, or account credentials. As mentioned, this vector may also be used to deliver an attack intended to disrupt the operation of a system, website, or network. A variety of techniques may be used to deliver a malicious payload or otherwise cause a disruption, with the one selected for use by a malicious actor depending upon factors that may include their goal, their level of expertise in disguising what they are doing or overriding security protections, or their knowledge of current weaknesses in security protocols. An attack may be focused on disrupting a service platform, or more directly targeted at a specific account, set of accounts, organization, or users. Because of the potential harm that such attacks can cause to individuals and organizations, as well as to service platforms and the related infrastructure, it is important to be able to identify and manage the risk arising from use of a cloud-based attack vector.

Unfortunately, due to the volume of data and the number of accounts that may be associated with a cloud-based system or platform, it is often not possible for personnel responsible for network and data security to allocate sufficient resources to effectively monitor the system or platform, identify potential threats, and/or resolve problems caused by attacks. Further, because of the multiple types of attacks that may be used to compromise accounts and/or disrupt a cloud-based platform, an additional strain is placed on the available resources.

The potential harm from a successful attack is believed to scale differently than in conventional situations, with the growth of the potential risk being a non-linear function of the number of accounts being managed. This is due to the compromise of an account potentially allowing a malicious actor to obtain access to multiple other accounts or to the accounts of a different tenant. In addition, the risk to the platform or infrastructure may scale non-linearly due to the spread of a software virus from multiple sources, for example.

The combination of a quickly increasing number of targets (for example, arising from accounts, data items, and infrastructure elements) and the potential harm should an attack be successful indicate the value of a solution that enables a security analyst to manage the threats arising from use of a cloud-based vector. Unfortunately, conventional approaches and tools used to respond to and address the cyber-security threat landscape suffer from one or more disadvantages. These include a need to expend a large amount of IT or security personnel time and resources on device-specific installations and updates and being based on a device-oriented approach to providing security. These limitations of conventional approaches and tools become even more problematic in view of the expansion of cybersecurity attacks to include networks and remote servers or other infrastructure.

Systems and methods are needed for more efficiently and effectively responding to the recent changes in the cybersecurity threat landscape. Embodiments of the disclosure are directed toward solving these and other problems individually and collectively.

SUMMARY

The terms "invention," "the invention," "this invention," "the present invention," "the present disclosure," or "the disclosure" as used herein are intended to refer broadly to all the subject matter described in this document, the drawings or figures, and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification of this patent, to any or all figures or drawings, and to each claim.

As will be described, in some embodiments, the disclosure is directed to systems, devices, and methods for managing the threat of cybersecurity attacks implemented by using a cloud-based account or platform as a threat vector. As mentioned, cloud-based services and platforms may be used as a threat vector for a cyber-attack in one or more ways. Because of the substantial resources needed to monitor the array of threat targets and attack modes, embodiments instead provide a mechanism for comparing cloud-based threats and potential targets by generating a metric for use by security analysts, termed a cloud-based attack index (CAI) herein.

The disclosed index considers those users who have been a target of a cloud-based attack, assigns a value to the severity or potential severity of the attack or threat based on the type of attack, and generates a metric for a user that provides an indication of the potential harm to a cloud-based platform arising from attacks directed at that person or account. The metric may then be used by a security analyst to determine how best to allocate resources to monitoring the account or accounts associated with each person having access to a cloud-based service platform. This will help in reducing the number of successful attacks in the future and reduce the harm that could be caused by a successful attack.

As mentioned, conventional approaches and tools for addressing cloud threats have significant disadvantages due to the large number of threats and targets and the relatively high cost of counter measures, particularly when compared to the corresponding return on investment (ROI) of cybersecurity management tools and a shortage of qualified personnel. This problem is compounded by the following aspects:

- The diverse nature of modern cloud threats and attacks, and the usage (in some attacks, the simultaneous usage) of multiple attack methods by bad actors make it difficult for security teams to identify the most at-risk targets; and
- A lack of an ability to prioritize the potential targets based on the level of risk associated with cloud threats leads to over-provisioning of the security tools and, in the case of budget limitations, to a lower level of protection than is needed to effectively manage the problem;
- a difficulty in obtaining a comprehensive picture of cybersecurity, which combines multiple types of threats (email related threats, cloud-based accounts and data, and networks, for example; and
- conventional methods protect assets (i.e., physical or virtual devices, and networks), and are not applicable to monitoring and protecting the large number of potential targets or objects that may be part of or that are using a cloud-based platform.

Embodiments of the disclosure are directed to systems, apparatuses, and methods for more effectively preparing for and responding to cybersecurity threats directed at a cloud-based platform. In some embodiments, this is achieved by determining or generating a cloud attack index (CAI) for each of a set of accounts. In one embodiment, the CAI is a function of the potential severity (i.e., harm) resulting from a specific type of attack and the confidence level in a system detecting such an attack (for example, by correctly determining that an attack is of the type identified). In one embodiment, the CAI is a sum of terms, with each term representing a product of the potential severity and the confidence level for a date within a range between a first date and a second date.

Based on a value for the CAI that is generated for each account or user, a security analyst can identify those accounts/users that represent a more substantial contribution to the overall cybersecurity risk. These accounts/users may then be monitored or otherwise have resources allocated to reducing the risk they present, for example by one or more of:

- more closely monitoring the cloud-related actions and activities associated with the account;
- limiting access to specific resources or sources of risk;
- enforcing or requiring two-factor authentication or another enhanced authentication measure; or
- assigning the user to a cyber security training program.

Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

BRIEF DESCRIPTION OF THE DRAWINGS

Embodiments of the disclosure are described with reference to the drawings, in which:

FIG. 2(*b*) is a diagram illustrating an example of a formula or method for calculating a cloud attack index (CAI), in accordance with some embodiments;

FIG. 2(*c*) is a table illustrating an example of a set of score multiplier factors that may be applied to the data provided by a specific detector, when implementing an embodiment of the disclosure;

FIG. 2(*d*) a diagram illustrating another example of a formula or method for calculating a cloud attack index (CAI), in accordance with some embodiments;

FIG. 2(*e*) is a graph illustrating an example distribution of cloud attack index (CAI) values as determined for a time interval using the methods disclosed;

FIG. 2(*f*) is a graph illustrating a correlation between a probability of an account or user being compromised by an attack and the account or user cloud attack index value during the period in which a value for the cloud attack index was calculated;

FIG. 2(*g*) is a graph illustrating a predicted probability of an account or user being compromised by an attack within the indicated timeframe of 1, 7, or 30 days based on the account or user cloud attack index value;

Note that the same numbers are used throughout the disclosure and figures to reference like components and features.

DETAILED DESCRIPTION

Figure 1:
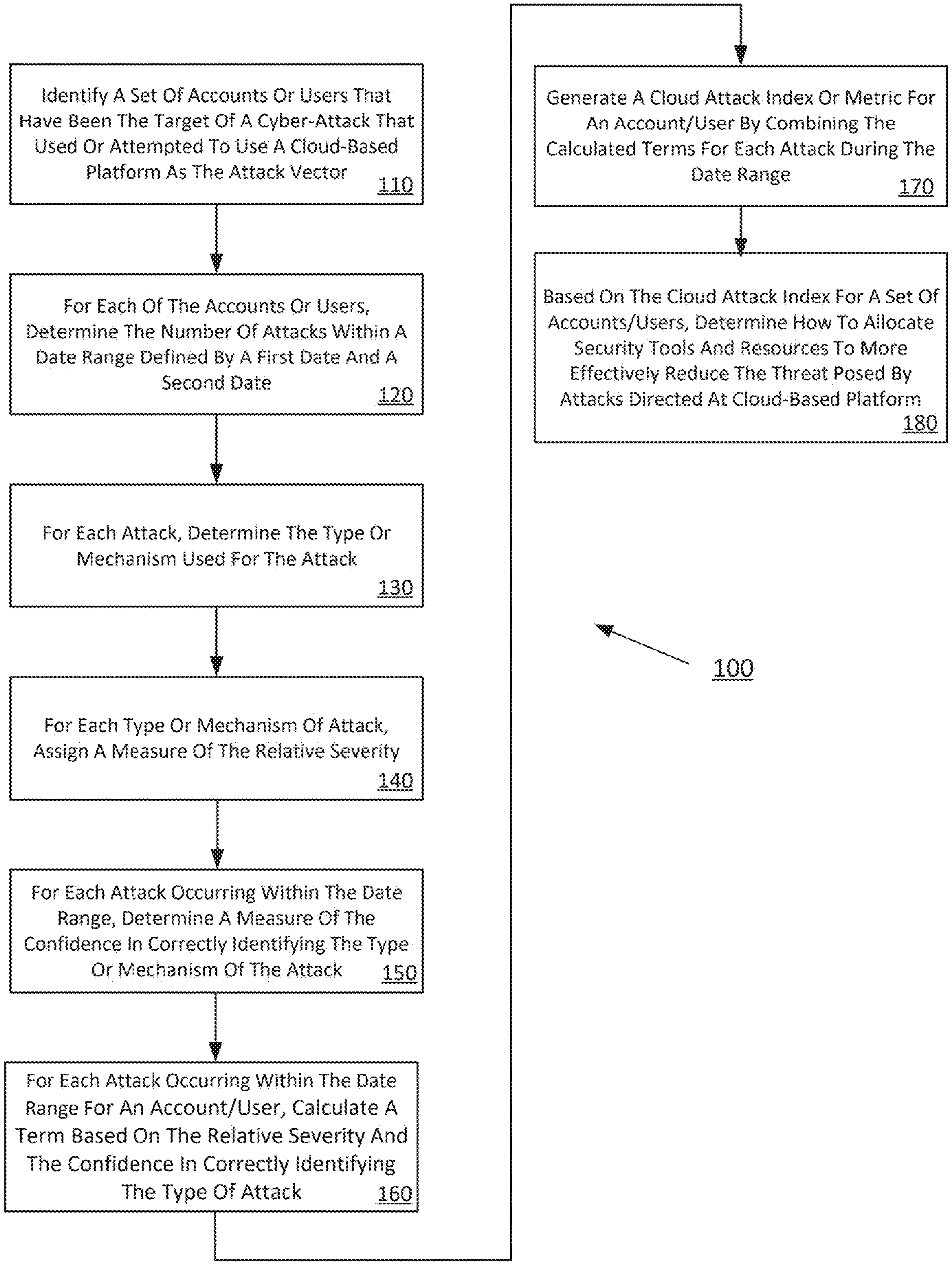
FIG. 1 is a flowchart or flow diagram illustrating a method or process for more effectively preparing for and responding to cybersecurity threats directed at a cloud-based platform, in accordance with some embodiments.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosed systems and methods may be practiced. The disclosed systems and methods may, however, be embodied in different forms and should not be construed as limited to the embodiments set forth herein; rather, these embodiments are provided so that this disclosure will satisfy the statutory requirements and convey the scope of the disclosed invention(s) to those skilled in the art.

Embodiments of the disclosure may be implemented in whole or in part as a system or systems, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, or controller, as non-limiting examples) that is part of a client device, server, network element, remote platform (such as a SaaS platform), or other form of computing or data processing system, device, or platform.

The processing element or elements may be programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. Note that an embodiment of the disclosed methods may be implemented in the form of an application, a sub-routine that is part of a larger application, a "plug-in", an extension to the functionality of a data processing system or platform, or other suitable form. The following detailed description is, therefore, not to be taken in a limiting sense.

As used herein, the term or phrase "cybersecurity risk" or "risk" refers to a measure of the likelihood of a person, employee, group, sub-group, target type, or organization being the target of a cybersecurity attack or of the likelihood of an attack being successful. It may also refer to a measure of the potential damage to the organization if the user's account is compromised. In some examples, the attack may be intended to obtain unauthorized access to data or information, to devices, to networks, or to systems. In one example, an attack may be in the form of an attempt to obtain a person's credentials, such as username and password. The cybersecurity risk or risk may be expressed in any suitable manner, including, but not limited to a score, a range of scores, a descriptive level or degree, an indication of inclusion in a specific risk category or group, etc.

In implementing an embodiment of the disclosed systems and methods, the description distinguishes between two types of data. These are information about attacks and information about accounts:

- Information about attacks can be collected from different cloud security products and analytic tools. As part of this data, the system will have a reference to the attacked user account, e.g., "suspicious login to abcd@company.com account". This will include all accounts under the attack regardless of whether this user account is managed by a security provider. For example, an attacker may try different accounts until they discover a real one based on the format of the account addresses. Then, the system might try to discover, which account belonged to a specific customer.
- More information about the attacked account can be acquired from one or more of:
  - accessing a user repository;
  - a client on a user end-point; or
  - another database or directory product.

Embodiments of the systems, apparatuses, and methods disclosed herein are directed to implementations of an approach and techniques for more effectively preparing for and responding to cybersecurity threats directed at a cloud-based platform. With increasing volume of cloud attacks, a security team needs be able to identify most targeted individuals to provide more immediate and effective protection against cloud threats to those people, while prioritizing the overall investment in security.

The disclosed Cloud Attack Index (CAI) is a score assigned to each person/account who was a target of a cloud attack. The Cloud Attack Index is a weighted sum of the cloud attack attempts regardless of the attack's success or failure. In one embodiment, each type of attack is assigned a weight depending on a product of the severity of the threat (on a numerical or other scale) and the confidence that the attack being considered is of the type it is categorized (and therefore associated with a severity metric). For example, an APT cloud attack (a suspicious login attempt from within an organization) has 9 times higher severity metric than a brute-force cloud attack.

In some embodiments, the benefits of the disclosed approach may be achieved by a process flow that may include the following steps, stages, processes, methods, operations, or functions as described with reference to FIG. 1, which is a flowchart or flow diagram illustrating a method or process 100 for more effectively preparing for and responding to cybersecurity threats directed at a cloud-based platform:

- identify a set of accounts or users that have been the target of a cyber-attack that used or attempted to use a cloud-based platform as the attack vector (as suggested by step or stage 110);
- for each of the accounts or users, determine
  - the number of attacks within a date range defined by a first date and a second date (step or stage 120);
  - for each attack within the date range, determine the type or mechanism used for the attack (as suggested by step or stage 130, and where examples will be provided herein);
    - for each type or mechanism used for an attack, assign a relative severity factor (step or stage 140);
      - where, as an example the relative severity is expressed as a number between one (1) and ten (10);
      - where, as non-limiting examples, the relative severity may be determined by a trained model, a formula, a rule, an equation, or other methodology, and may depend on one or more factors, such as:
        - the number of accounts that may be impacted or the resources required to effectively prevent or recover from an attack, as non-limiting examples;
      - in some embodiments, how focused an attack is may impact its severity measure;
        - a wider, less personally focused attack not targeting a specific individual may receive a lower degree of severity;
        - for example, a collaboration attack (an attack via a shared file on a common data store), requires the attacker to be familiar with the format of organizational documents;
        - in some cases, a collaboration attack can be targeted at an individual. In that case, the attacker must be familiar with the relative context, e.g., name of the project the individual works on;
        - the more effort an attacker invests in an attack, the more targeted/personalized it could be and, potentially more dangerous to the safe operation of a cloud platform;
  - for each attack within the date range, determine a measure of the confidence or likelihood of correctly identifying the type or mechanism of the attack (step or stage 150);
    - where, as non-limiting examples, the confidence of an event being correctly determined to represent a certain type of attack may be determined by a trained model, a formula, an equation, historical data, or other suitable methodology;
  - for each attack within the date range for an account/user, calculate a term based on the relative severity and the confidence in correctly identifying the type of attack (step or stage 160);
    - in one embodiment, each term is a product of the relative severity and the confidence in correctly identifying the type of attack. This represents one form for generating each term used to evaluate the cybersecurity risk represented by a specific user—as further disclosed, depending upon the type of attack (and/or the account/user), it may be determined that a different form for each term more accurately reflects the relative risk created by that type of attack on the account/user;
      - as a non-limiting example, using actual data from previous attacks, it may be determined that for some types of attacks and/or accounts, a function such as a logarithm or exponent applied to a severity measure for a type of attack and/or confidence level in identifying the attack more accurately represents the actual risk created by the attack;
  - generate a cloud attack index (CAI) or metric for an account/user by summing (or otherwise combining, such as by using the logarithmic expression illustrated in FIG. 2(*d*)) the calculated terms for each attack on the account/user occurring during the date range (step or stage 170); and
  - based on the cloud attack index for one or for a set of accounts/users, determine how to allocate security tools and resources to more effectively reduce the threat posed by attacks directed at a cloud-based platform (step or stage 180);
    - in some embodiments, this may include generating a user interface to permit a security analyst to access and interact with data regarding the CAI and other sources of cyber-security risk for an account or accounts, and in response to perform a task, such as one or more of:
      - monitoring those accounts/users having a higher cloud attack index score or value;
      - using machine learning or a data analysis technique to determine a factor or factors that targeted accounts have in common that make them susceptible to being a target or to an attack being successful;
      - applying additional or enhanced security measures to certain accounts—this would focus resources on the riskier accounts/users rather than spread those resources across an organization. As examples:
      - a threshold based on the CAI can be defined and an automatic response to the CAI value exceeding the threshold during a time range can be executed. For example:
        - user accounts with a high CAI (i.e., a value exceeding a threshold value) could be suspended for a period of time;
        - multi-factor authentication or other security measure may be applied automatically applied to all users with a high CAI; or
        - user accounts with an intermediate level or higher CAI value may be required to participate in further security training relating to identity protection.

Among other benefits, embodiments of the systems and methods disclosed herein provide tools and approaches that can assist an IT or cybersecurity professional to more effectively identify accounts at a relatively higher risk from cyber-attacks that use a cloud-based platform as the threat vector. Based on identifying these accounts, a specific security protocol or procedure can be applied, where the security protocol or procedure may be directed at assisting in preventing an attack or limiting the potential harm from a successful attack.

The disclosed approach and techniques provide an alternative to conventional approaches to managing the threat of cyber-attacks directed at a cloud-based platform. In larger organizations, focusing solely on individuals and their devices, or applying security measures across an entire organization are not as effective or efficient operational practices. Instead, determining those accounts/users who present the highest risk to a cloud-based platform and in response providing appropriate risk management and resources is a more effective approach and a more efficient allocation of resources for addressing cybersecurity risk.

As mentioned, security threats and attacks targeting a cloud-based platform may take several forms and be executed in several different ways. As non-limiting examples, these include one or more of the following techniques or mechanisms:

- APT—an Advanced Persistence Threat is identified when a suspicious login attempt from an internal IP address is determined;
- Lateral movement—is a type of attack where a malicious email is sent from an internal account;
- Collaboration attack—this type of attack occurs when a collaboration platform (e.g., SharePoint and OneDrive) are used to for sharing/distribution of malicious content (e.g., malware) with the targets;
- Cloud Phishing—a type of attack on a cloud account combining a phishing email followed by a suspicious login;
- Brute-force—attacks on cloud accounts performed by enumerating potential passwords and/or user account identifiers; and
- Cloud Phishing Speculative—a type of attack which cannot be classified.

New types of attacks may be determined in the future and added to the set of attack types evaluated.

A combination of characteristics makes cyber-attacks directed at cloud-based platforms or cloud-platform infrastructure more difficult to manage and control using conventional approaches. This is at least partially because the potential harm increases more rapidly with increased users than does the harm from attacks on user devices or private networks. This is believed to be the result of at least the following factors:

- the number of accounts that can become contaminated by an attack;
- the relatively large number of types or ways of executing an attack; and
- the harm that can be caused if an attack is able to compromise other tenants on a multi-tenant platform or the infrastructure used to provide services to users beyond those attacked directly.

Together, these factors make the detection, management, control, and response to cyber threats targeting a cloud platform a different type of challenge than when protecting personal devices and servers connected to a private network. As such, the problem of allocating the finite resources available to addressing cyber threats becomes more difficult when the threats are targeted at cloud-based platforms.

One approach to addressing the resource management problem is disclosed herein, and that is to determine a measure or metric characterizing the threat to a cloud-based platform and associated infrastructure by attacks directed at one or more accounts of a multi-tenant platform.

This may be followed by directing a greater proportion of the available cybersecurity risk management resources to those accounts most likely to be a target or to be a source of a disproportionate amount of harm if an attack succeeds.

Figure 2E:
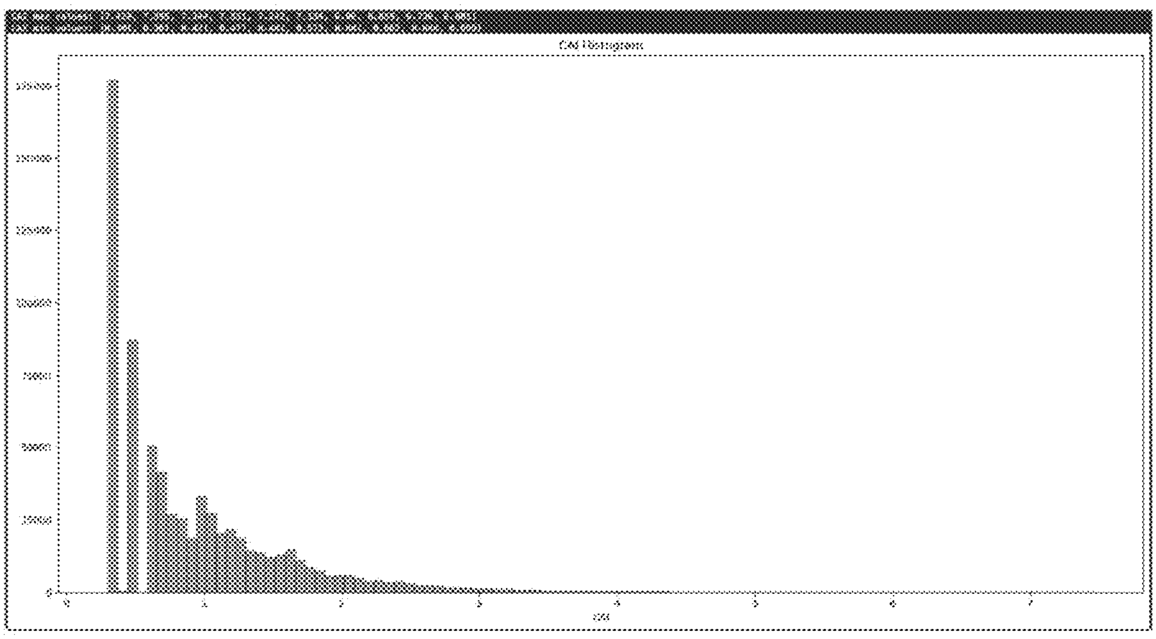
FIG. 2(*a*) is a chart illustrating examples of types or categories of attacks directed at a cloud-based platform and a measure of the severity assigned to that type of attack, in accordance with some embodiments.
Figure 2F:
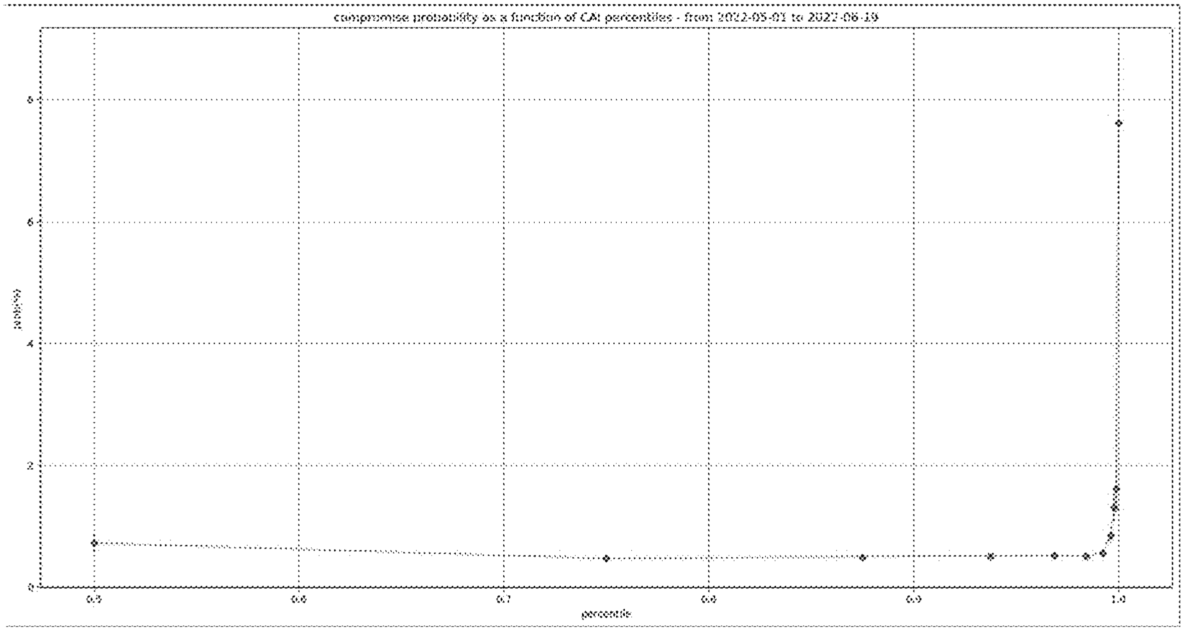
Figure 2G:
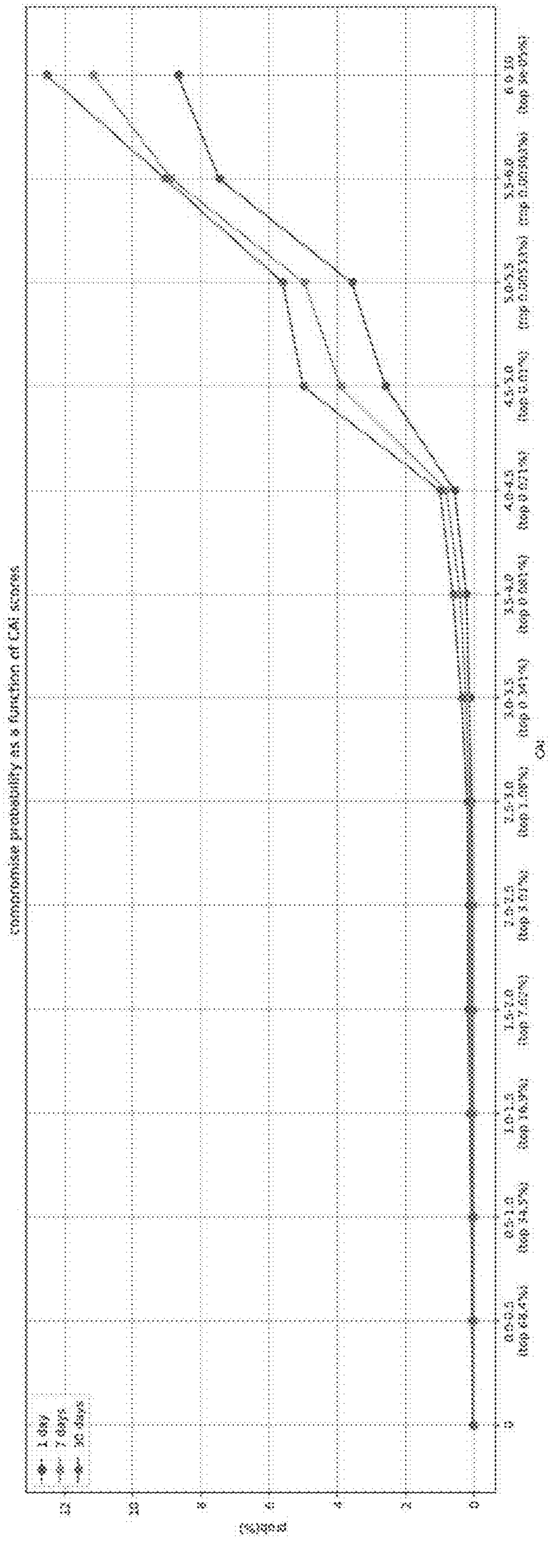

As described with reference to FIG. 1, in one embodiment, such a metric may be generated by the following steps, stages, functions, or operations:

- identify those accounts/users managed by a cloud-based platform that have been the target of an attack (typically, this is determined between a first date and a second date);
- for each targeted account:
  - for each attack against that account, identify the type or mechanism of the attack;
  - assign a severity value or measure to each type or mechanism of attack;
    - in one embodiment, this may be the result of a trained model, formula, rule, or equation, for example;
      - as non-limiting examples, the severity measure may be based on data collected from a prior attack or a model representing how such a type of attack would be manifested as harm to the operation of the cloud-based platform;
- determine a measure of the confidence or likelihood that the type or mechanism of the attack was correctly identified;
  - in one embodiment, this may be the result of performing a statistical analysis on historical data related to attacks targeting the platform;
- generate a term based on the assigned severity value and the confidence value for each attack occurring within a defined date range;
  - in one embodiment, such a term may be a product of the assigned severity value and the confidence value for each attack;
  - in one embodiment, such a term may be represented by a specific function or relationship between the assigned severity value and the confidence value for each attack (such as a logarithm or power function);
    - in some embodiments, the form for representing each term may be found by fitting actual data for each attack event to one or more possible representations;
- combine the generated product terms for each attack occurring within the defined date range to generate a cloud attack index (CAI) for that account/user;
  - in one embodiment, the combination is a sum of the individual terms;
  - in some embodiments, a normalization process may be used to enable comparison of the risk to multiple accounts based on an average threat per attack, as an example;
  - in some embodiments, the product terms and/or sum of terms calculation may be replaced by other forms of generating each term or combining the terms;
    - for example, a weighting term for each attack may be based on a likelihood of success of an attack (which may be a factor of the type of attack, the type of account or user, the context in which an attack is initiated, or the potential financial harm from a successful attack, for example);
    - as another example, a weighting term for each attack (or for some types of attacks) may be replaced by a term that is defined by an equation, a model output, a fit to a curve, or other suitable methodology;
    - the sum of weighting terms may be replaced by a calculation of a norm of the weighing terms (i.e., the square-root of the sum of the squares of the weighting terms), or other suitable methodology;
    - the sum of weighting terms may be replaced by a logarithmic or other form of function, such as that illustrated in FIG. 2(*d*); and based on the CAI for an account or set of accounts (or the relative CAI compared to other accounts), determine an allocation of security resources, training, or procedures to apply to the account or accounts;
- this may include generating one or more displays, diagrams, tables, or graphs, for example, and enabling an analyst to investigate trends, CAI values, the CAI as a function of time or other metrics for an individual account, a group of accounts, an organization, or for an account or accounts having specific characteristics;
- this may include allowing an analyst to access or generate other cybersecurity threat or risk assessment data, such as the types described in U.S. patent application Ser. No. 16/935,636 titled "System and Methods for Reducing an Organization's Cybersecurity Risk Based on Modeling and Segmentation of Employees", filed Jul. 22, 2020, the entire contents of which is hereby incorporated by reference;
  - this may include providing an analyst with one or more user interface elements that may be used to select data to examine, and to indicate a response to the data examined, such as by implementing a specific security practice or requirement.

As mentioned herein, in some embodiments, a trained model or models may be used to perform one or more of the data processing steps or functions disclosed. For example, a trained machine learning model may be used to generate or determine a weight (for example, a product of an attack type severity and a confidence level in identifying the type of attack, or other form of term based on those factors) to be assigned to a specific attack when calculating the cloud attack index (CAI). As a non-limiting example, an input to a trained model might include the following factors as training data and then as inputs to the trained model:
- a list of cloud attacks on an account, each with an associated attack type or category (which may reflect the mechanism used for the attack) and an associated severity measure;
  - in one embodiment, the severity measure may itself be determined by a trained model, rule, or formula that is able to access data regarding a type of attack and its resulting harm (financial and otherwise), the likelihood of a type of attack being successful (which may be related to an organization's operating characteristics and procedures), or the recovery time from an attack, as non-limiting examples of factors that may be considered;
- an indication of the time/date when a specific attack on an account/user happened (to enable determining the cloud attack index during a time or date range); and
- a measure of the confidence of the type of attack being detected and correctly identified for each example attack;
  - in some embodiments, each detection "event" is comprised of one or more attributes, each of which may be associated with a positive or negative confidence modifier—these are considered in accordance with a dynamic and optimized weight function. Further, the accuracy of the attributes and detectors may be periodically validated using manual and/or automated methods.

In response to the inputs, a trained model may output a CAI value assigned to an individual for a specified time or date range, with the value reflecting the risk of the account being targeted by a cyber-attack targeting a cloud-based account. Note that the probability of a successful attack directed at an account should correlate with the value of the CAI in the sense that a person with a higher CAI should have a higher probability of having their cloud account compromised. In one embodiment, a model can be trained on a set of real data reflecting attempts and successes of cloud attacks across multiple organizations.

Use of the disclosed cloud attack index and associated techniques may provide a cybersecurity team with one or more of the following benefits:
- an ability to associate people in an organization with their relative degree of risk, and in response to prioritize the application of cybersecurity prevention and remediation services;
- an ability to correlate different security threats and modes of attack to obtain a fuller picture of the cybersecurity threat to an organization; and
- an ability to take person or group-specific actions to reduce the likelihood of a successful cybersecurity attack and take proactive steps to prevent further attacks.

In some embodiments, a machine learning model (ML) may be trained and used in a process to evaluate one or more contributions to the cybersecurity risk of an organization, person, user, group, or sub-group. In some examples, the trained model may operate to assign a score, metric, label, level, or other indicator of risk or of relative risk to a person based on one or more attributes or risk characteristic(s) of the person. Such attributes may include but are not limited to factors that are relevant to the likelihood of the person being attacked or to the likelihood of an attack being successful, such as reflected by the disclosed CAI.

As disclosed, the data or information used to determine a risk profile, metric, score, classification, segmentation, category, or other indication of a degree of risk for a specific account/person may include:
- A list of the different types or categories of cloud attacks experienced;
- The time when each detected attack occurred; and
- A measure of the confidence level in the correct determination of the type of attack.

Note that these types of data can be used to determine a CAI value assigned to an individual account, which would help to determine the risk a person or persons associated with the account are exposed to or are responsible for creating. As mentioned, the probability of a successful attack on an account is expected to be correlated with the value of the CAI in the sense that an account with a higher CAI should have a higher probability of having (now or in the future) the cloud account compromised.

The signals and/or data obtained from security monitoring products and that is used to identify a type of attack may be in the form of a measure or format that is specific to a security product. This means that in some cases the data or signals may need to be converted or transformed into a common format (i.e., normalized) so that they can be compared, filtered, subjected to a threshold, and combined. In some embodiments, this conversion or transformation may be in the form of a mapping between a signal or data and a risk measure based on the experience of an analyst or cybersecurity advisor.

As mentioned, in some embodiments, a score, classification, or other metric indicating a relative measure or degree of cybersecurity risk for a person may be determined using a trained machine learning (ML) model. In one example, the inputs to a trained model are one of the types of information or signals described above that are obtained from a security product. In this use of a trained model, the model first "learns" how the signals or data from the security products relate to a risk measure or score for a risk factor. In this sense, the model is trained to translate or convert raw signal data into risk scores representing a contribution to the overall risk presented by (or to) an account/user. After training, the model applies what it has learned to new data and generates a measure or score that can be combined with other measures or scores to assist in segmenting a person into a specific risk group or sub-group.

In general, a machine learning model is trained using a set of annotated or labeled training data. The training data may be a portion of actual data used to evaluate the risk to an organization for a group of employees of an organization. For example, one-half of the actual security product signals and data for the employees in an organization may be used as training data. Associated with the data is a label or annotation indicating the "correct" attack type, cybersecurity risk category, or CAI score for an account, as non-limiting examples.

The labels serve to "teach" the model how to associate the input attributes (the input data associated with an account or attack) with the desired output information (the CAI or other risk metric value and/or the risk/likelihood for the account to be attacked). A machine learning model is trained on the labeled dataset in a form of supervised learning. The model may be a deep learning neural network (DLNN) or other form representing a trainable set of relationships.

In one embodiment, a trained model assigns a CAI score, metric, risk level, or other form of classification for a person based on input data that is relevant to a risk factor or risk contribution. A plurality of trained models may be used to develop a set of scores, metrics, classifications, segmentations, or categories for a person. The separate scores or metrics may require conversion or transformation into a form in which they can be compared and/or combined. One example method of combining multiple risk scores or metrics to produce a final or overall cybersecurity risk score or metric is described in pending U.S. patent application Ser. No. 16/935,636 titled "System and Methods for Reducing an Organization's Cybersecurity Risk Based on Modeling and Segmentation of Employees", filed Jul. 22, 2020, and claiming priority from U.S. Patent Application Ser. No. 62/945,465, titled "Modeling and Segmentation of People Oriented Risk in Cybersecurity Applications", filed Dec. 9, 2019, the entire contents of both of which are incorporated by reference to the extent permissible. The process described in the referenced applications may be used to combine the individual risk scores or metrics for each of a plurality of sub-nodes or lower-level nodes in a risk modeling tree into a risk measure for a higher-level category or node.

In some embodiments, a normalization procedure may be used and may be specific to the type of information collected. For example, a process may convert specific types of data into static risk scores, may use ranges of counters, apply thresholds, perform a comparison to company and industry averages, or may use specific algorithms which add additional factors to a risk score calculation. Normalization may be used to be able to compare or combine various types of risk related data, such as data from different sources of risk related security events or the outputs of models. For example, in some cases security event data may represent the number of violations (of a data loss prevention policy (DLP), for example), while in other cases data may be a score (representing a degree of a person's security awareness as indicated by security training, for example). Based on the source of security related data, it may require a form of normalization to be combined with other risk factor scores and used to generate a total risk score or overall metric or measure.

As described, the signals and data from cloud security products and monitoring processes may be used as inputs to one or more trained machine learning models. The output or outputs of the models may represent classifications, segmentations, metrics, or scores for a person/account with regards to one or more sources or types of cybersecurity risk. The set of classifications, segmentations, metrics, or scores may be normalized, combined, or subject to thresholding (as non-limiting examples) to obtain a final risk score or metric. The risk scores or metrics for a set of people in an organization may be combined to obtain a score or metric for the organization. Further, based on the risk group or groups to which a person is assigned or into which they are segmented, a specific risk reduction process or protocol may be applied. The risk reduction process or protocol applied may be specifically directed at reducing or preventing risk arising from a characteristic of the members of a group or from a type of attack.

As a non-limiting example, the data or information used to determine a risk profile, metric, score, classification, segmentation, category, or other indication of a degree of risk for a specific person may include:

- data from security products relevant to attacks directed at that person;
  - for example, network, system, or device monitoring software that identifies information regarding sources of attacks, attack vectors, the timing of attacks, attack methods (e.g., email, text, etc.);
  - signals that can be used to determine a relative magnitude of the attacks on a specific person and the timing of attacks;
  - signals that can be used to determine a specific source or type of attack source/actor;
  - in general, data or signals indicative of one or more of an attack, a risk of being attacked or the risk of an attack being successful;
- information about behavioral vulnerabilities of the person obtained from the security products and the person's security awareness training (which may be indicative of a person's cyber security awareness or susceptibility to a specific type of attack or technique);
  - this can consider the amount of training, time of the training, responses to training scenarios, or other relevant factors; and
- information about personal privileges and access;
  - for example, a person's access to sensitive data and applications;
  - business authorizations;
  - management roles;
  - access to systems and networks;
  - this information may in some cases be obtained from system or network user data repositories (e.g., directories) and privilege management systems, as well as from security products.

Note that each of these types of data provides information relevant to one of three general categories or groups of people at risk—attacked people, vulnerable people, and privileged people. For example, the likelihood or risk of being attacked may be related to a person's prior history of being attacked, their role in an organization and access to critical data or systems, or their behaviors (such as regarding patching security flaws in software they use, accessing an organization's network over an insecure connection, clicking on links in emails, etc.). Similarly, the likelihood or risk of an attack being successful may be impacted by a person's behavior and their previous cybersecurity training.

Examples of the value propositions and benefits of embodiments of the systems and methods described may include:

- Prioritization—since there are limited resources available to apply to a security solution, the systems and methods disclosed can be used to assist security officers and analysts to prioritize how to invest in security related applications, detection mechanisms, or training. In this sense, the systems and methods disclosed can help place a focus on certain groups of people that may require additional security controls (i.e., security investment) or vice-versa;
- Correlation—it is often difficult to correlate data between multiple channels of security events and personal data. The systems and methods disclosed may use the CAI formula (or a different one) to construct a correlated cloud risk score based on data obtained from security products that correspond to different types of cloud security threats. This provides an ability to further process the information and find specific sources of threats, risk trends, or anomalies, as examples; and
- Mitigation—by enabling segmenting of people at risk and identifying the factors that make them part of a risk group/segment or target group, an analyst can select and prioritize the application of specific security measures or techniques. This enables a security team to avoid applying security controls across an entire organization (unless indicated as necessary) and allows an analyst to address the highest priority risks before allocating limited resources to addressing lower priority risks.

Segmenting the people in an organization into groups, sub-groups, and intersections of sub-groups (and hence into target types or profiles) may provide a cybersecurity team with one or more of the following benefits:

- an ability to associate people in an organization with their relative degree of cloud cybersecurity risk, and in response to prioritize the application of threat prevention and remediation techniques and services;
- an ability to correlate different cloud security threats and modes of attack to obtain a more complete picture of the cloud cybersecurity threat to an organization; and
- an ability to take account, person, or group-specific actions to reduce the likelihood of a successful cloud cybersecurity attack and to take proactive steps to prevent further attacks.

FIG. 2(*a*) is a chart illustrating examples of types or categories of attacks directed at a cloud-based platform and a measure of the severity assigned to that type of attack, in accordance with some embodiments. As shown in the figure, each type or category of attack may be associated with a (relative) severity measure or factor. The severity measure may be expressed as a number, for example between 1 and 10. As mentioned, the severity measure or factor may be determined by a trained model, a formula, a rule-set, a subject matter expert, or other suitable method, and may be a function of one or more characteristics of the type or category of attack, including but not limited to (or required to include):

- relative focus or degree of personalization of an attack;
- relative potential harm from a successful attack of that type (taking into consideration both direct financial harm, harm to customers, and disruption to operation of an organization);
- risk of attack resulting in unauthorized access to private or proprietary data (as that may expose an organization to criminal, statutory, and/or civil penalties); or
- ability to recover fully from a successful attack, and within a desired timeframe.

FIG. 2(*b*) is a diagram illustrating an example of a formula or method for calculating a cloud attack index (CAI), in accordance with some embodiments. As shown in the figure, in one embodiment, the CAI is a sum of terms, with one term for each attack directed at a user or account, and with each term representing a product of a severity measure for a type of attack and a confidence level that an attack can be correctly identified as being of a specific type or category. Further and as disclosed herein, other forms of generating a CAI may be used in addition to or instead of that shown in FIG. 2(*b*).

FIG. 2(*b*) suggests a general formula or method for calculating a cloud attack index (CAI), specifically a sum of product terms, with one term for each attack directed at a user or account, and with each term representing a product of a severity measure for a type of attack and a confidence level that an attack can be correctly identified as being of a specific type or category. However, other forms of representing each term may be used. For example, in some embodiments, data indicating actual attacks may be used to suggest a different form for each term, with the form possibly dependent upon the type or category of attacks being considered. An example of an alternative way of determining a value for the cloud attack index is described with reference to FIGS. 2(*c*) and 2(*d*).

FIG. 2(*c*) is a table illustrating an example of a set of score multiplier factors that may be applied to the data provided by a specific detector, when implementing an embodiment of the disclosure. As suggested by the table, in one embodiment a score multiplier or weighting factor may be expressed as a combination of a severity measure and a term representing a confidence level in detecting or identifying a type of attack (as is also suggested by the formula in FIG. 2(*b*)).

FIG. 2(*d*) is a diagram illustrating another example of a formula or method for calculating a cloud attack index (CAI), in accordance with some embodiments. In contrast to the sum of product terms suggested in FIG. 2(*b*), the formula shown in FIG. 2(*d*) calculates a cloud attack index (CAI) value based on a sum over all detectors from which data is acquired for a product or service:

$$s_d \times [\log(1 + n_d)],$$

where $s_d$ is the score multiplier for a detector d (such as that suggested in FIG. 2(*c*)), and $n_d$ is a number of suspicious logins (or attempts) and/or days with suspicious logins (or attempts).

As part of implementing one or more embodiments of the disclosure, actual attack data for a category of attacks was accessed and used to assist in determining the multiplier terms and the method used to combine the individual terms. The relationship between a cloud attack index value and the probability of a future compromise to an account were also studied. This served to validate the utility and predictive accuracy of the disclosed index. As an example, FIG. 2(*e*) is a graph illustrating an example distribution of cloud attack index (CAI) values as determined for a time interval using the methods disclosed. In the illustrated example, the CAI formula shown in FIG. 2(*d*) was used. In developing the concept and implementation details for the CAI, actual large-scale data reflecting of benign access, attempted malicious access, and successful malicious data were considered. In one case, the data examined was obtained from multiple organizations of different sizes across different industries. Further, the attacks examined were diverse and comprised most (if not all) known attack methodologies.

With regards to the data used to develop and/or validate the relationships illustrated in FIG. 2(*d*), during the analysis, a scenario was encountered in which users were targeted by both email-based attacks (and received what are referred to as Tap detections) and by brute force attacks (and received brute force (BF) detections). In that situation, there is a limited capability to determine which suspicious login events were caused by which form of attack, since they were mixed together. Brute Force attacks typically occur in great numbers, and when they are mixed with Tap detections, they may cause a CAI score to reach a high value that does not accurately describe the actual attack risk for a user. To address this potential error, an approach was adopted in which the risk evaluation counted the number of days where a user had Tap detections, instead of the number of Tap detections. This resulted in a more balanced score output and also takes into account the persistence factor of the attack on the user.

FIG. 2(*f*) is a graph illustrating a correlation between a probability of an account or user being compromised by an attack and the account or user cloud attack index value during the period in which a value for the cloud attack index was calculated. This graph validates the disclosed approach, as it suggests a correlation between the cloud attack index value and the probability of an account having been attacked and compromised.

FIG. 2(*f*) illustrates a correlation between the CAI score divided into percentiles (X axis) and a probability of being compromised (Y axis). Sorting users by their CAI score from the lowest to highest enables dividing them into percentile groups and analyzing each group individually. In the figure, there is a dot for percentile 0.5, which represents the group of users with the top 50% CAI scores, a dot for percentile 0.75, which represents the group of users with top 25% CAI scores and so on. For each group of users, the analysis checked the proportion of the compromised users and saved the results. This was done every day for 30 days and the data for each day was collected individually. For each percentile group, the analysis calculated the average proportion of compromised users, and adjusted it to be displayed as a probability. The vertical line in the figure (at percentile value 1.0) represents the standard deviation. As indicated by the data represented in the figure, starting from approximately percentile 0.98 there is an exponential growth in the percentage of compromised users. This is significant because it suggests that users with the top 2% CAI scores tend to be more likely to be compromised, and there is a good correlation between high CAI scores and a corresponding high probability to be compromised.

FIG. 2(*g*) is a graph illustrating a predicted probability of an account or user being compromised by an attack within the indicated timeframe of 1, 7, or 30 days based on the account or user cloud attack index value. This graph suggests a relationship between the value of a cloud attack index for an account and the likelihood of an attack during a specified timeframe. As suggested by the graph, the probability of an attack and account compromise increases rapidly for a CAI value above 4.5 (as a non-limiting example) and becomes more likely as time passes.

FIG. 2(*g*) illustrates correlations between the CAI score divided into score groups (X axis) and the probability of users with these CAI scores being compromised in the future (Y axis). For each day and for each user who has a calculated CAI score at date T, the analysis checked if the user had successful suspicious logins at the time frame of T+t, where t is 1, 7, or 30 days. This provided an indication of whether a user got compromised a day, a week, or a month after the calculation of a CAI score for the user. This was also done for users with a zero score to serve as a baseline. After performing this analysis for 30 individual days, the groups were divided as shown in the figure and the average percentage of users that got compromised 1, 7, and 30 days after determining a CAI score was calculated. The compromised percentage was represented as a probability to be compromised. It can be inferred from FIG. 2(*g*) that users with higher CAI scores are more likely to be compromised in the near future. This correlation provides a proof of concept for the resulting CAI score calculation method, since it represents the risk of attack for a user, which directly represents a risk of a successful attack in the near future.

As suggested by the data collected and evaluated as part of validating the disclosed approach, the formula utilized to calculate the index value may be varied, with the formula selected for a specific set of accounts or organization being at least partially dependent upon the types of attacks being identified, and the available data that may be used to validate a formula and set of weights or score multipliers (and any factors used to generate a value for a multiplier). As a non-limiting example, a weighting factor could be defined to have a decay factor based on time. Further, although the range of CAI values may be varied (i.e., from something other than 1 to 10), the data analysis performed by the inventors suggests that this range is sufficient for the majority of situations.

Figure 3:
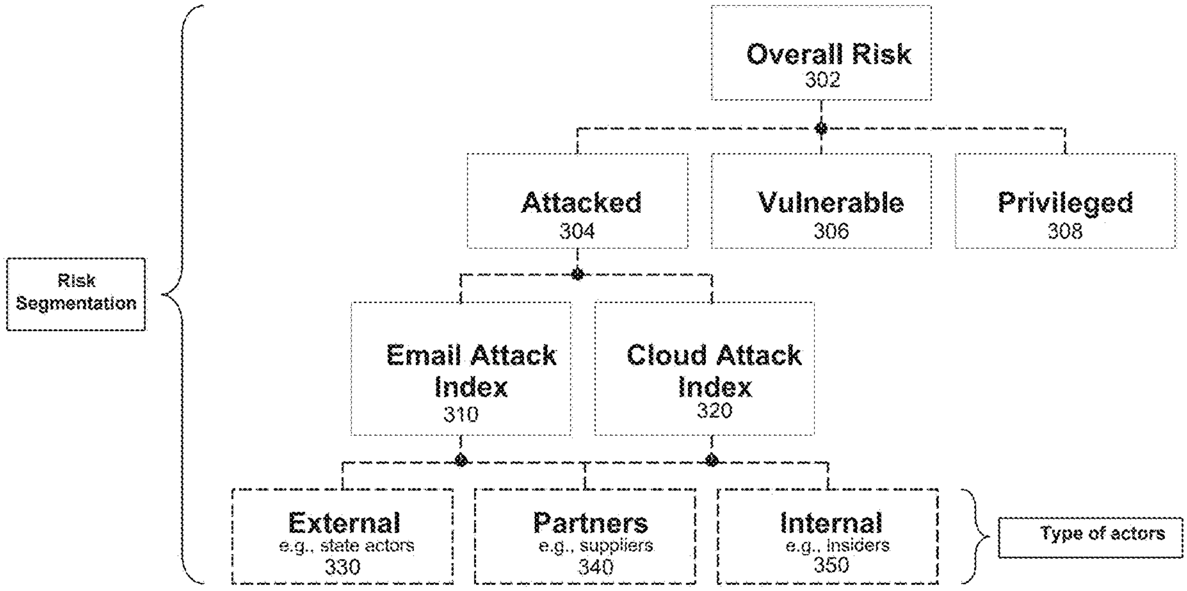
FIG. 3 is a diagram illustrating how the disclosed cloud attack index (CAI) may be used as part of a comprehensive approach to managing the threat of cyber-attacks, in accordance with some embodiments.

FIG. 3 is a diagram illustrating how the disclosed cloud attack index (CAI) may be used as part of a comprehensive approach to managing the threat of cyber-attacks, in accordance with some embodiments. As shown in the figure, in some embodiments, an overall cyber-security risk 302 for an organization, group, or set of individuals may be comprised of a risk attributed to specific categories of users, in this example risk arising from Attacked users or accounts 304, Vulnerable users or accounts 306, and Privileged users or accounts 308. As further suggested by the figure, for Attacked users 304, a risk measure arising from email-based attacks (shown as Email Attack Index 310 in the figure) and from Cloud based attacks (shown as Cloud Attack Index 320 in the figure) may be generated or calculated. As also shown or suggested in the figure, the source or actor responsible for generating an attack may be one of several types, for example, External 330, Partner 340, or Internal 350.

Thus, as suggested by FIG. 3, the disclosed Cloud Attack Index (CAI) may be a factor that contributes to the risk attributed to attacked users or accounts, which is a factor in determining the overall risk presented by (or to) one or more users, groups, or an organization. In some embodiments, the CAI score can be correlated with other sources of risk or factors believed to contribute to risk. These may include:

- an employee's seniority or business function, which may be used to identify a group of people at a relatively higher risk of being attacked; or
- an employee's behavior patterns (behavioral vulnerabilities), which may be used to identify behaviors that result in an increased likelihood of an account or person being attacked or an attack being successful.

In some embodiments, a graphical display or user interface may be used by a cybersecurity or IT administrator to (among other functions) examine an overall risk score or contribution to a risk score (such as the CAI disclosed herein) for a user, as well as its component factors or attributes. Such a display may also be used to examine the process by which a user was exposed to a threat. The display may also provide an administrator with tools to adjust the allocation of security resources directed to a user (such as activating specific applications or screening programs or implementing specific security requirements).

A variety of algorithms or data processing methods may be used for data normalization as part of generating a risk measure. Such algorithms or methods may take into consideration one or more of the volume, spread, frequency, velocity, or other characteristic of each processed threat signal or type of data. Once a risk score or metric corresponding to each threat signal or source of threat data is calculated by a suitable model or data processing technique, a risk tree may be populated with risk scores for the threats. The risk scores can be used to identify the people centric threat groups, sub-groups, and target groups, thereby providing a segmented understanding of the cybersecurity risks associated with a set of people.

In a general sense and in some embodiments, the cybersecurity risk remediation systems and processes disclosed herein may perform one or more of the following methods, functions, processes, operations, or tasks:

- for each of a set of people who were targeted by an attack on an account managed by a cloud-based platform during a specified date range:
  - obtain data related to the attempted attacks from security products and threat monitoring services;
    - this may include signals and data related to security events or security-related events (i.e., including signals and data from cloud security products and from events or activities that may impact security);
  - the processing may include use of one or more trained machine learning models to transform raw data or signals into a form in which the data can be used to extract information regarding the type or category of an attack, or other relevant information;
- where applicable, for each attack directed at a person or account during a date range, input relevant data into one or more logical processes, rule-sets, trained machine learning models, or other form of decision process to output:
  - (a) an identification of the type of attack;
  - (b) a measure of the severity of the attack (if this has not already been determined for each type or category of attack); and/or
  - (c) a measure of the likelihood of having correctly identified an attack as being of a specific type or category (in some sense, a confidence level in a model or decision process output);
- based on the assigned or determined severity and the measure of the likelihood of correctly identifying an attack as being of a specific type or category, generate a weighting factor for each attack on a user or account during the date range;
  - in one embodiment, this may be a product of the severity and likelihood of correct identification of the type or category of attack;
  - in one embodiment, this may be a different function of the severity and/or confidence values (such as a specific equation or raising a factor to a power of the other factor);
- combine the weighting factors for each attack during the date range to generate a cloud attack index (CAI) for that person or account; and
  - in one embodiment, the combination may be a sum of the individual weighting factors;
  - in one embodiment, the combination may be represented by another function, such as a power law, exponentiation, logarithm (such as illustrated in FIG. 2(*d*)), curve fit, or other mathematical function;
- generate a display or user interface to enable a security analyst to investigate and evaluate the CAI score and contributions to risk for an organization, or from a person, a subset of people, a risk group, a sub-group, or a target group within the organization;
  - this may include providing selectable UI elements to enable an analyst to vary thresholds for generating an alert or for implementing a specific security measure or protocol, as non-limiting examples.

As a result of the segmentation, embodiments enable a cybersecurity analyst to perform one or more of a set of functions or operations, including but not limited to:

- Set or modify a security policy/protocol applicable to a specific group, sub-group, or target group;
- Set or modify a cybersecurity training program applicable to a specific group, sub-group, or target group;
- Compare one organization's security risk profile to that of another organization;
- Compare the security risk profile of the same organization over time;
- Implement a risk prevention program for a specific group, sub-group, or target group;
- Implement a specific remediation policy in response to a successful attack on a group, sub-group, or target group;
- Monitor and evaluate the cybersecurity risk to an organization over time, including monitoring of at-risk people or groups, attack methods (the threat vector), sources of attacks, and successful attacks;
- Compare one organization's security/attack-prevention expenditures and approaches to that of another organization;
- Allocate or reallocate cybersecurity resources and infrastructure to at-risk groups, sub-groups, or target types in response to a dynamic change in membership of a group, sub-group, or target group; or
- Analysis of the reasons or factors responsible for a person being moved from one group, sub-group, or target group to another.

In some embodiments, one or more machine learning model(s) being implemented may be trained using historical data collected from multiple users and organizations, either with or without the addition of anonymized information from the organization whose employees or users are being analyzed.

In some embodiments, raw data is collected from one or more security products. The data may be acquired directly from the security products, obtained from a data storage element in which the security products store data for a specific organization or group (such as for an account maintained on a multi-tenant platform in the case of cybersecurity protection being provided as part of a SaaS platform), or other suitable source. The raw data may comprise signals, information, event counts, or other forms of data or information indicating the occurrence of a security event and/or information characterizing an event. The security products may comprise security monitoring, device monitoring, account monitoring, network monitoring or other infrastructure monitoring and protection products or services. The signals, information, event counts, or data may result from a security event, such as a successful cybersecurity attack or attempted attack. The signals, information, event counts, or data may also (or instead) result from a different type of cybersecurity related event or activity.

A security analyst may then apply a suitable security procedure, constraint, restriction, or protocol to one or more of the members of each group, sub-group, and target group. The security procedure, constraint, restriction, or protocol applied may be directed at addressing the characteristics of a person or group that may them susceptible to an attack or to a successful attack. This pro-active approach to preventing cybersecurity attacks or reducing the potential harm from a successful attack is one of the benefits available through use of the embodiments disclosed and/or described herein.

An applied security process or protocol may involve one or more of generating alerts, blocking access to sites, filtering of posted information, preventing access to systems, websites, or data during certain times, review of on-line social network or other postings to remove company specific information, development of rules for employee use of social network sites, increased training, or placing of restrictions on the use of specific vendors or services, as non-limiting examples. Other possible security processes or protocols that may be applied include, but are not limited to (or required to include):

- Denying access from externally controlled networks, such as login from an internet café;
- Enforcing stronger identification protocols for an employee, such as multi-factor authentication (MFA);
- Setting a stricter security policy for an employee; or
- Configuring or tuning other security systems or products based on an employee's seniority and/or role or function to tighten policies or configurations, such as a firewall policy limiting access to a site for employees with certain seniority or functional roles.

Figure 4:
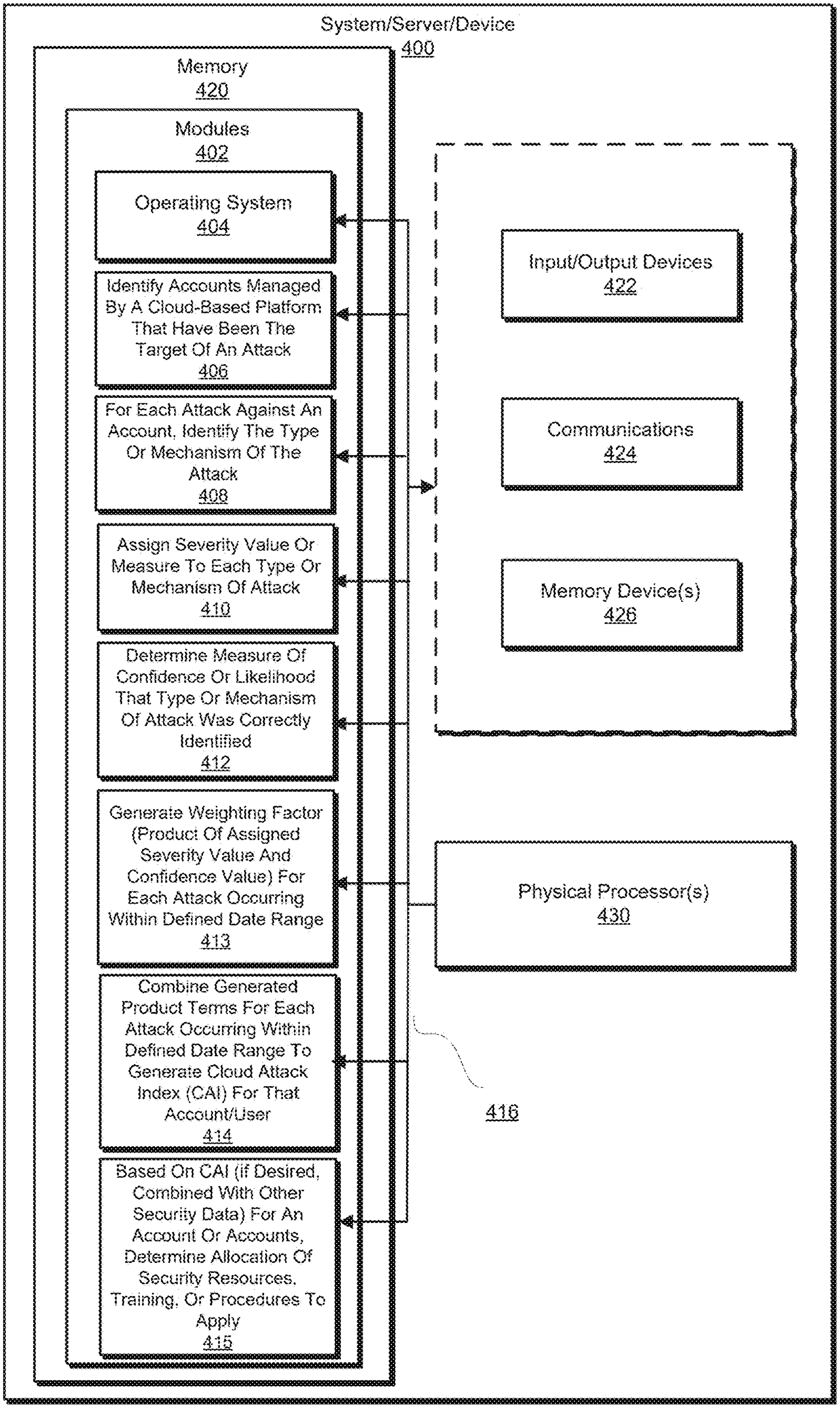
FIG. 4 is a diagram illustrating elements or components and concepts that may be present in a computing device, server, or system configured to implement a method, process, function, or operation in accordance with embodiments of the systems and methods described herein.

FIG. 4 is a diagram illustrating elements, components, or processes that may be present in or executed by one or more of a computing device, server, platform, or system 400 configured to implement a method, process, function, or operation in accordance with some embodiments. In some embodiments, the disclosed system and methods may be implemented in the form of an apparatus or apparatuses (such as a server that is part of a system or platform, or a client device) that includes a processing element and a set of executable instructions. The executable instructions may be part of a software application (or applications) and arranged into a software architecture.

In general, an embodiment of the disclosure may be implemented using a set of software instructions that are designed to be executed by a suitably programmed processing element (such as a GPU, TPU, CPU, microprocessor, processor, controller, or computing device, as non-limiting examples). In a complex application or system such instructions are typically arranged into "modules" with each such module typically performing a specific task, process, function, or operation. The entire set of modules may be controlled or coordinated in their operation by an operating system (OS) or other form of organizational platform.

The modules and/or sub-modules may include a suitable computer-executable code or set of instructions, such as computer-executable code corresponding to a programming language. For example, programming language source code may be compiled into computer-executable code. Alternatively, or in addition, the programming language may be an interpreted programming language such as a scripting language.

As shown in FIG. 4, system 400 may represent one or more of a server, client device, platform, or other form of computing or data processing device. Modules 402 each contain a set of executable instructions, where when the set of instructions is executed by a suitable electronic processor (such as that indicated in the figure by "Physical Processor(s) 430"), system (or server, or device) 400 operates to perform a specific process, operation, function, or method.

Modules 402 may contain one or more sets of instructions for performing a method or function described with reference to the Figures, and the disclosure and/or descriptions of the functions and operations provided in the specification. These modules may include those illustrated but may also include a greater number or fewer number than those illustrated. Further, the modules and the set of computer-executable instructions that are contained in the modules may be executed (in whole or in part) by the same processor or by more than a single processor. If executed by more than a single processor, the processors may be contained in different devices, for example a processor in a client device and a processor in a server.

Modules 402 are stored in a memory 420, which typically includes an Operating System module 404 that contains instructions used (among other functions) to access and control the execution of the instructions contained in other modules. The modules 402 in memory 420 are accessed for purposes of transferring data and executing instructions by use of a "bus" or communications line 416, which also serves to permit processor(s) 430 to communicate with the modules for purposes of accessing and executing instructions. Bus or communications line 416 also permits processor(s) 430 to interact with other elements of system 400, such as input or output devices 422, communications elements 424 for exchanging data and information with devices external to system 400, and additional memory devices 426.

Each module or sub-module may correspond to a specific function, method, process, or operation that is implemented by execution of the instructions (in whole or in part) in the module or sub-module. Each module or sub-module may contain a set of computer-executable instructions that when executed by one or more programmed processors or co-processors cause the processor or co-processors (or a device, devices, server, or servers in which they are contained) to perform the specific function, method, process, or operation. As mentioned, an apparatus in which a processor or co-processor is contained may be one or both of a client device or a remote server or platform. Therefore, a module may contain instructions that are executed (in whole or in part) by the client device, the server or platform, or both. Such function, method, process, or operation may include those used to implement one or more aspects of the disclosed system and methods, such as for:

- identifying those accounts managed by a cloud-based platform that have been the target of an attack (as suggested by module 406);
- for each targeted account:
  - for each attack against that account, identifying the type or mechanism of the attack (as suggested by module 408);
  - assigning a severity value or measure to each type or mechanism of attack (module 410);

- in one embodiment, this may be the result of a trained model, rule, formula, or equation, for example;
- determining a measure of the confidence or likelihood that the type or mechanism of the attack was correctly identified (module 412);
  - in one embodiment, this may be the result of performing a statistical analysis on historical data related to attacks targeting the platform;
- generating a weighting factor, for example a term representing a product of the assigned severity value and the confidence value for each attack occurring within a defined date range (module 413);
  - in some embodiments, the weighting factor or term may be a scaled product, a logarithmic term, a result of inserting the severity and confidence values into an equation, or other form (which may result from an analysis of actual threat data or signals);
- combining the generated weighting or product terms for each attack occurring within the defined date range to generate a cloud attack index (CAI) for that account/user (module 414);
  - in one embodiment, the combination may be a sum of the individual weighting factors;
  - in one embodiment, the combination may be represented by another function, such as a power law, exponentiation, logarithm (such as illustrated in FIG. 2(*d*)), curve fit, or other mathematical function;
  - in some embodiments, a normalization process may be used to enable comparison of the risk to multiple accounts based on an average threat per attack, for example;
  - in some embodiments, the product terms or sum of product terms may be replaced by other forms of generating each term or combining the terms. For example, a weight given to each term may be based on a likelihood of success of an attack (which may be a factor of the type of attack, the type of account or user, the context in which an attack is initiated, or the potential financial harm from a successful attack, for example); and
- based on the CAI for an account or set of accounts (or the relative CAI compared to other accounts) and/or threat data and risk assessment for other sources, determine an allocation of security resources, training, or procedures to apply to the account or accounts (module 415);
  - in some embodiments, this may include creating displays and associated UI elements to enable a cybersecurity analyst to examine the CAI value for an individual account, group of accounts, or organization, including the ability to examine CAI, average CAI, and CAI as a function of time between dates of interest, or for accounts having a specified characteristic or characteristics.

Figure 5:
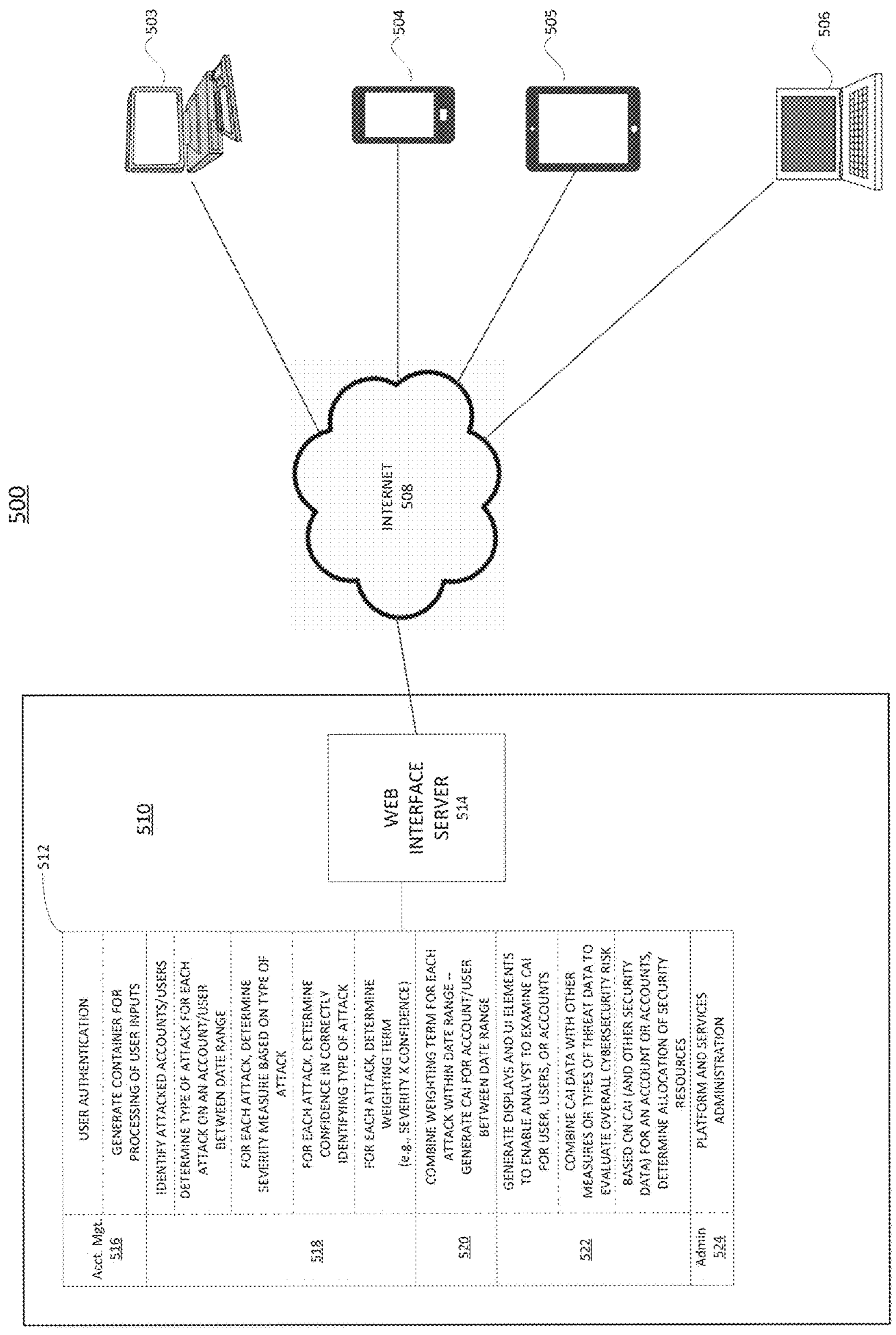
FIGS. 5-7 are diagrams illustrating an architecture for a multi-tenant or SaaS platform that may be used in implementing embodiments of the systems and methods described herein.
Figure 6:
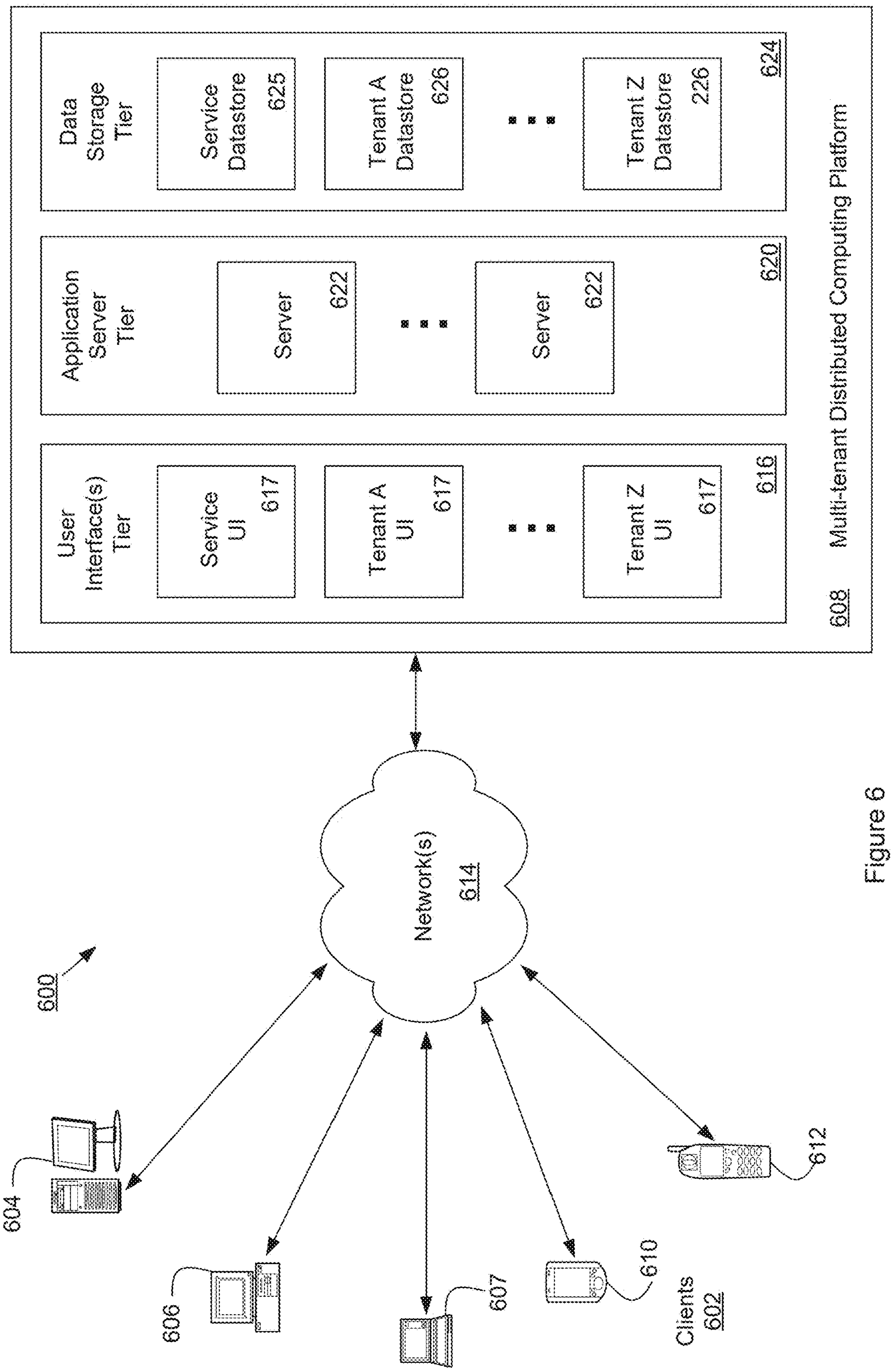
Figure 7:
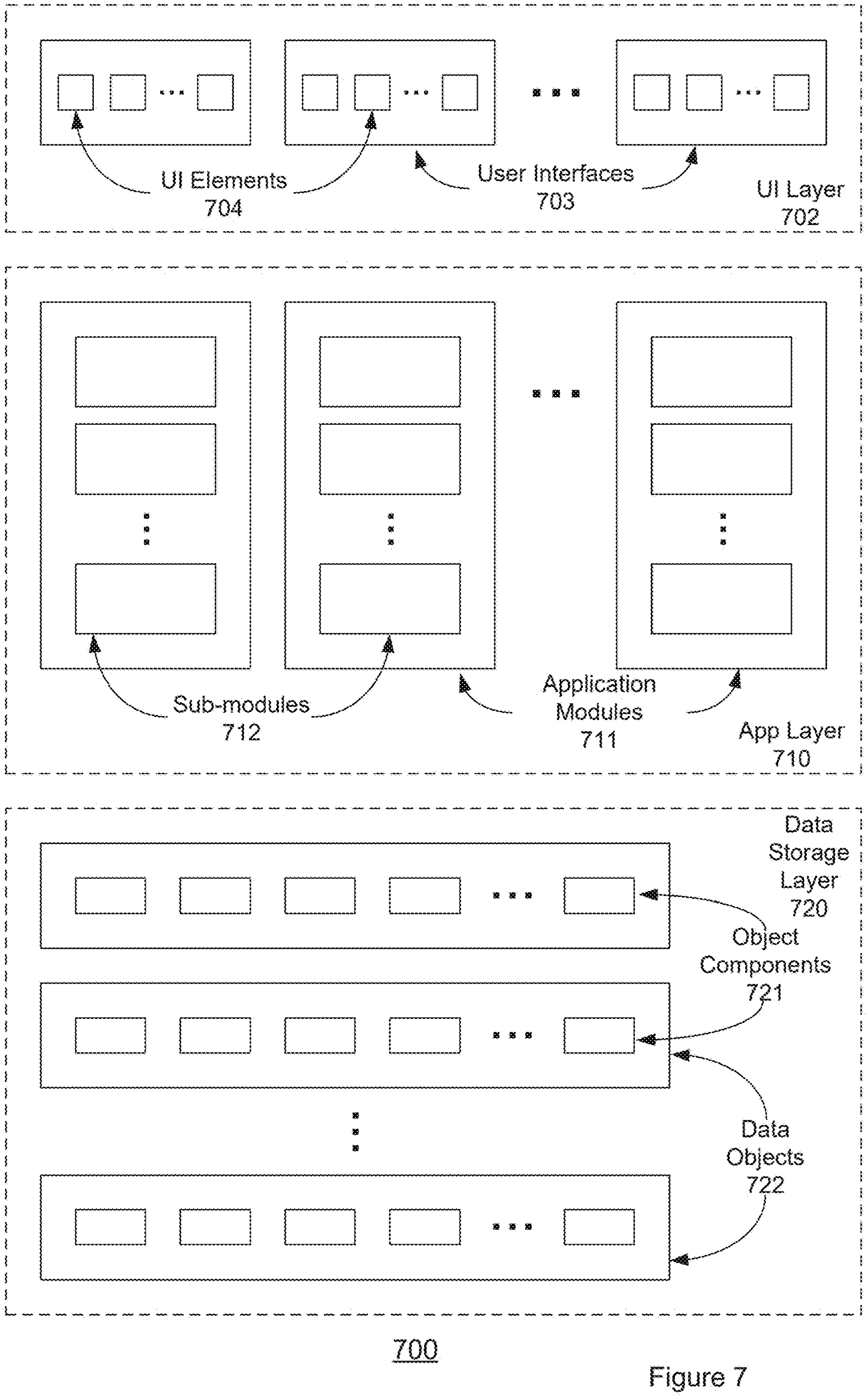

In some embodiments, the functionality and services provided by the system and methods described herein may be made available to multiple users by accessing an account maintained by a server or service platform. Such a server or service platform may be termed a form of Software-as-a-Service (SaaS). FIG. 5 is a diagram illustrating a SaaS system in which an embodiment may be implemented. FIG. 6 is a diagram illustrating elements or components of an example operating environment in which an embodiment may be implemented. FIG. 7 is a diagram illustrating additional details of the elements or components of the multi-tenant distributed computing service platform of FIG. 6, in which an embodiment may be implemented.

In some embodiments, the system or services disclosed and/or described herein may be implemented as micro-services, processes, workflows, or functions performed in response to the submission of threat data and a user's instructions. The micro-services, processes, workflows, or functions may be performed by a server, data processing element, platform, or system. In some embodiments, the data analysis and other services may be provided by a service platform located "in the cloud". In such embodiments, the platform may be accessible through APIs and SDKs. The functions, processes and capabilities described herein may be provided as micro-services within the platform. The interfaces to the micro-services may be defined by REST and GraphQL endpoints. An administrative console may allow users or an administrator to securely access the underlying request and response data, manage accounts and access, and in some cases, modify the processing workflow or configuration.

Note that although FIGS. 5-7 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide the cybersecurity data analysis and risk assessment services disclosed and/or described herein. Although in some embodiments, a platform or system of the type illustrated in FIGS. 5-7 may be operated by a 3rd party provider to provide a specific set of business-related applications, in other embodiments, the platform may be operated by a provider and a different business may provide the applications or services for users through the platform.

FIG. 5 is a diagram illustrating a system 500 in which an embodiment may be implemented or through which an embodiment of the services disclosed and/or described herein may be accessed. In accordance with the advantages of an application service provider (ASP) hosted business service system (such as a multi-tenant data processing platform), users of the services described herein may comprise individuals, businesses, stores, or organizations, as non-limiting examples. A user may access the services using a suitable client, including but not limited to desktop computers, laptop computers, tablet computers, scanners, or smartphones. In general, a client device having access to the Internet may be used to provide data to the platform for processing and evaluation. A user interfaces with the service platform across the Internet 508 or another suitable communications network or combination of networks. Examples of suitable client devices include desktop computers 503, smartphones 504, tablet computers 505, or laptop computers 506.

System 510, which may be hosted by a third party, may include a set of services to 512, and a web interface server 514, coupled as shown in FIG. 5. It is to be appreciated that either or both the services 512 and the web interface server 514 may be implemented on one or more different hardware systems and components, even though represented as singular units in FIG. 5. Services 512 may include one or more functions or operations for assisting an analyst to evaluate and assess the risk from cyber-attacks directed at a cloud-based platform or system.

As examples, in some embodiments, the set of functions, operations or services made available through the platform or system 510 may include:

Account Management services 516, such as

- a process or service to authenticate a user (typically, in conjunction with submission of a user's credentials);
- a process or service to generate a container or instantiation of the services or applications that will be made available to the user;

Attacked Account Data Processing services 518, such as a process or service to:

- Identify Attacked Accounts/Users;
- Determine Type of Attack for Each Attack on An Account/User Between a Specified Date Range;
- For Each Attack, Determine a Severity Measure Based on the Type of Attack;
- For Each Attack, Determine a Confidence in Correctly Identifying the Type of Attack;
- For Each Attack, Determine a Weighting Factor (for example, Severity×Confidence);

Cloud attack Index (CAI) Calculation services 520, such as a process or service to:

- Combine Weighting Terms for Each Attack Within a Date Range—Generate CAI For Account/User Between the Date Range;
- As disclosed, the combination methodology may be specific to a type or category of attacks;
  - Non-limiting examples of a combination methodology include a sum of terms or use of a logarithmic equation, such as that illustrated in FIG. 2(*d*);

Security Analyst Evaluation Services 522, such as a process or service to:

- Generate Displays and UI Elements to Enable Analyst to Examine CAI For User, Users, Or Accounts;
- Combine CAI Data with Other Measures or Types of Threat Data to Evaluate Overall Cybersecurity Risk;
- Based On CAI (And in Some Cases, Other Security Data) For an Account or Accounts, Determine Allocation of Security Resources, Training, Or Procedures to Apply;

Administrative services 524, such as

- a process or services to enable the provider of the services and/or the platform to administer and configure the processes and services provided to users, such as by altering how weighting terms are calculated, how the CAI is calculated, or how the CAI or other threat information is presented to an analyst, for example.

The platform or system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, or web server. A web server is a most often a combination of hardware and the software that helps deliver content, commonly by hosting a website, to client web browsers that access the web server via the Internet.

FIG. 6 is a diagram illustrating elements or components of an example operating environment 600 in which an embodiment may be implemented. As shown, a variety of clients 602 incorporating and/or incorporated into a variety of computing devices may communicate with a multi-tenant service platform 608 through one or more networks 614. For example, a client may incorporate and/or be incorporated into a client application (i.e., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 414 include networks utilizing wired and/or wireless communication technologies and networks operating in accordance with any suitable networking and/or communication protocol (e.g., the Internet).

The distributed computing service/platform (which may also be referred to as a multi-tenant data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, or causing the execution of specific data processing operations, as non-limiting examples. Each application server or processing tier 622 shown in the figure may be implemented with a set of computers and/or components including computer servers and processors, and may perform various functions, methods, processes, or operations as determined by the execution of a software application or set of instructions. The data storage tier 624 may include one or more data stores, which may include a Service Data store 625 and one or more Tenant Data stores 626. Data stores may be implemented with any suitable data storage technology, including structured query language (SQL) based relational database management systems (RDBMS).

Service Platform 608 may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 622 that are part of the platform's Application Server Tier 620. As noted with regards to FIG. 5, the platform system shown in FIG. 6 may be hosted on a distributed computing system made up of at least one, but typically multiple, "servers."

As mentioned, rather than build and maintain such a platform or system themselves, a business may utilize systems provided by a third party. A third party may implement a business system/platform as described above in the context of a multi-tenant platform, where individual instantiations of a business' data processing workflow (such as the data analysis services and processing disclosed herein) are provided to users, with each business representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 7 is a diagram illustrating additional details of the elements or components of the multi-tenant distributed computing service platform of FIG. 6, in which an embodiment may be implemented. In general, an embodiment may be implemented using a set of software instructions that are designed to be executed by a suitably programmed processing element (such as a CPU, GPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

The example architecture 700 illustrated in FIG. 7 includes a user interface layer or tier 702 having one or more user interfaces 703. Examples of such user interfaces include graphical user interfaces and application programming interfaces (APIs). Each user interface may include one or more interface elements 704. For example, users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as a variety of controls, parameterized procedure calls, programmatic objects, and messaging protocols.

An application layer 710 may include one or more application modules 711, each having one or more sub-modules 712. Each application module 711 or sub-module 712 may correspond to a function, method, process, or operation that is implemented by the module or sub-module (e.g., a function or process related to providing business related data processing and services to a user of the platform). Such function, method, process, or operation may include those used to implement one or more aspects of the disclosed system and methods, such as for one or more of the processes or functions disclosed and/or described herein:

- identifying those accounts managed by a cloud-based platform that have been the target of a cyber-attack;
- for each targeted account:
  - for each attack against that account, identifying the type or mechanism of the attack;
  - assigning a severity value or measure to each type or mechanism of attack;
    - in one embodiment, this may be the result of a trained model, rule, formula, or equation, for example;
- determining a measure of the confidence or likelihood that the type or mechanism of the attack was correctly identified;
  - in one embodiment, this may be the result of performing a statistical analysis on historical data related to attacks targeting the platform;
- generating a weighting factor, for example a term representing a product of the assigned severity value and the confidence value for each attack occurring within a defined date range;
  - in some embodiments, the weighting factor may be generated by a formula, rule, equation, or other methodology;
- combining the generated weighting or product terms for each attack occurring within the defined date range to generate a cloud attack index (CAI) for that account/user;
  - in one embodiment, the combination may be a sum of the individual weighting terms/factors;
  - in one embodiment, the combination may be represented by another function, such as a power law, exponentiation, logarithm (such as illustrated in FIG. 2(*d*)), curve fit, or other mathematical function;
  - in some embodiments, a normalization process may be used to enable comparison of the risk to multiple accounts based on an average threat per attack, for example;
  - in some embodiments, the product terms or sum of product terms may be replaced by other forms of generating each term or combining the terms. For example, a weight given to each term may be based on a likelihood of success of an attack (which may be a factor of the type of attack, the type of account or user, the context in which an attack is initiated, or the potential financial harm from a successful attack, for example); and
- based on the CAI for an account or set of accounts (or the relative CAI compared to other accounts) and/or threat data and risk assessment for other sources, determine an allocation of security resources, training, or procedures to apply to the account or accounts;
  - in some embodiments, this may include creating displays and associated UI elements to enable a cybersecurity analyst to examine the CAI value for an individual account, group of accounts, or organization, including the ability to examine CAI, average CAI, and CAI as a function of time between dates of interest, or for accounts having a specified characteristic or characteristics.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

A data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further environments in which an embodiment of the invention may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

The present disclosure includes the following clauses and embodiments:

1. A method of managing a risk from cyber-attacks, comprising:
   identifying an account or accounts on a cloud-based platform that have been targeted by a cyber-attack;
   for each such account:
      identifying each attack targeting the account on the platform, and for each identified attack
         determining a type of attack, wherein the type of attack may include an attack mode or mechanism;
         assigning a severity measure for the determined type of attack;
         determining a confidence measure in the correct identification of the type of attack;
   generating a weighting term for each attack;
   combining the weighting terms for each attack on the account; and
   providing tools and displays to enable a security analyst to investigate the sum of the weighting terms and determine an allocation of cybersecurity risk resources to the account.
2. The method of clause 1, wherein the type of attack is one of an Advanced Persistence Threat, a Lateral movement attack, a Collaboration attack, Cloud Phishing, a Brute-force attack, or a Cloud Phishing Speculative attack.
3. The method of clause 1, wherein the weighting term for each attack is a product of the severity measure for the type of attack and the confidence measure in the correct identification of the type of attack.
4. The method of clause 1, wherein the tools and displays to enable the security analyst further comprise enabling the analyst to examine the sum of the weighing terms for an individual account, for a group of accounts, or for an organization.
5. The method of clause 4, wherein the tools and displays to enable the security analyst further comprise enabling the analyst to examine the sum of the weighting terms, the average sum, the sum as function of time between dates of interest or the sum for accounts having a specified characteristic or characteristics.
6. The method of clause 1, further comprising using machine learning or a data analysis technique to determine a factor or factors that targeted accounts have in common that make them susceptible to being a target or to an attack being successful.
7. The method of clause 1, further comprising setting a threshold value based on the sum of the weighting terms and automatically generating a response to the sum exceeding the threshold during a specified time range.
8. The method of clause 7, wherein the automatically generated response is one or more of suspending an account or user for a period of time, requiring use of multi-factor authentication to use an account, or requiring a user to participate in security training relating to identity protection.
9. A system for reducing the cybersecurity risk to an organization, comprising:
   at least one electronic processor;
   an electronic non-transitory data storage element including a set of computer-executable instructions that, when executed by the electronic processor, cause the system to
   identify an account or accounts on a cloud-based platform that have been targeted by a cyber-attack;
   for each such account:
      identify each attack targeting the account on the platform, and for each identified attack
      determine a type of attack, wherein the type of attack may include an attack mode or mechanism;
      assign a severity measure for the determined type of attack;
      determine a confidence measure in the correct identification of the type of attack;
   generate a weighting term for each attack;
   combine the weighting terms for each attack on the account; and
   provide tools and displays to enable a security analyst to investigate the sum of the weighting terms and determine an allocation of cybersecurity risk resources to the account.
10. The system of clause 9, wherein the type of attack is one of an Advanced Persistence Threat, a Lateral movement attack, a Collaboration attack, Cloud Phishing, a Brute-force attack, or a Cloud Phishing Speculative attack.
11. The system of clause 9, wherein the weighting term for each attack is a product of the severity measure for the type of attack and the confidence measure in the correct identification of the type of attack.
12. The system of clause 9, wherein the tools and displays to enable the security analyst further comprise enabling the analyst to examine the sum of the weighing terms for an individual account, for a group of accounts, or for an organization.
13. The system of clause 12, wherein the tools and displays to enable the security analyst further comprise enabling the analyst to examine the sum of the weighting terms, the average sum, the sum as function of time between dates of interest or the sum for accounts having a specified characteristic or characteristics.
14. The system of clause 9, wherein the instructions further cause the system to use machine learning or a data analysis technique to determine a factor or factors that targeted accounts have in common that make them susceptible to being a target or to an attack being successful.
15. The system of clause 9, wherein the instructions further cause the system to set a threshold value based on the sum of the weighting terms and automatically generate a response to the sum exceeding the threshold during a specified time range.

16. The system of clause 15, wherein the automatically generated response is one or more of suspending an account or user for a period of time, requiring use of multi-factor authentication to use an account, or requiring a user to participate in security training relating to identity protection.
17. One or more non-transitory computer-readable media comprising a set of computer-executable instructions that when executed by one or more programmed electronic processors, cause the processors or a device or apparatus in which they are contained to:
    identify an account or accounts on a cloud-based platform that have been targeted by a cyber-attack;
    for each such account:
        identify each attack targeting the account on the platform, and for each identified attack
        determine a type of attack, wherein the type of attack may include an attack mode or mechanism;
        assign a severity measure for the determined type of attack;
        determine a confidence measure in the correct identification of the type of attack;
    generate a weighting term for each attack;
    combine the weighting terms for each attack on the account; and
    provide tools and displays to enable a security analyst to investigate the sum of the weighting terms and determine an allocation of cybersecurity risk resources to the account.
18. The one or more non-transitory computer-readable media of clause 17, wherein the type of attack is one of an Advanced Persistence Threat, a Lateral movement attack, a Collaboration attack, Cloud Phishing, a Brute-force attack, or a Cloud Phishing Speculative attack.
19. The one or more non-transitory computer-readable media of clause 17, wherein the weighting term for each attack is a product of the severity measure for the type of attack and the confidence measure in the correct identification of the type of attack.
20. The one or more non-transitory computer-readable media of clause 17, wherein the instructions further cause the processors or a device or apparatus in which they are contained to use machine learning or a data analysis technique to determine a factor or factors that targeted accounts have in common that make them susceptible to being a target or to an attack being successful.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

In some embodiments, certain of the methods, models or functions described herein may be embodied in the form of a trained neural network, where the network is implemented by the execution of a set of computer-executable instructions. The instructions may be stored in (or on) a non-transitory computer-readable medium and executed by a programmed processor or processing element. The specific form of the method, model or function may be used to define one or more of the operations, functions, processes, or methods used in the development or operation of a neural network, the application of a machine learning technique or techniques, or the development or implementation of an appropriate decision process. Note that a neural network or deep learning model may be characterized in the form of a data structure in which are stored data representing a set of layers containing nodes, and connections between nodes in different layers are created (or formed) that operate on an input to provide a decision, classification, or value as an output.

In general terms, a neural network may be viewed as a system of interconnected artificial "neurons" that exchange messages between each other. The connections have numeric weights that are "tuned" or set during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a dataset of inputs in an assortment of representative input patterns that are associated with their intended output response (e.g., a label). Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Any of the software components, processes or functions described in this application may be implemented as software code to be executed by a processor using any suitable computer language such as, for example, Java, JavaScript, Python, C, C++, or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DV D) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

As used herein (i.e., the claims, figures, and specification), the term "or" is used inclusively to refer to items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method of managing a risk from cyber-attacks, comprising:

identifying multiple accounts on a cloud-based platform that have been targeted by a cyber-attack;

for each account of the multiple accounts:

identifying each cyber-attack targeting the account;

determining a type of attack for each cyber-attack;

assigning a severity measure for the determined type of attack;

determining a confidence measure in correct identification of the type of attack;

generating a weighting term for each cyber-attack based on the severity measure and the confidence measure; and combining the weighting terms to obtain a cloud attack index (CAI) for the account;

based on the CAI for the multiple accounts, identifying a subset of the accounts as a group that contribute more to overall cybersecurity risk and that share a common factor indicative of susceptibility to a cyber-attack;

determining a cybersecurity prevention action associated with the common factor;

receiving a user input selecting the cybersecurity prevention action for the group; and applying the selected cybersecurity prevention action to each account in the group.

2. The method of claim 1, wherein the type of attack is one of an Advanced Persistence Threat, a Lateral movement attack, a Collaboration attack, Cloud Phishing, a Brute-force attack, or a Cloud Phishing Speculative attack.

3. The method of claim 1, wherein the weighting term for each cyber-attack is a product of the severity measure for the type of attack and the confidence measure in the correct identification of the type of attack.

4. The method of claim 1, further comprising identifying the group of the multiple accounts that have more contribution to the risk using machine learning to determine a factor that each of the accounts in the group have in common that indicates a susceptibility to being a target or to a cyber-attack being successful.

5. The method of claim 1, further comprising setting a CAI threshold value and automatically applying the cybersecurity prevention action to each account of the multiple accounts with a CAI exceeding the CAI threshold value during a specified time range.

6. The method of claim 1, wherein the cybersecurity prevention action is suspending each account of the group for a period of time, requiring use of multi-factor authentication for each account of the group, or requiring each user of each account of the group to participate in security training relating to identity protection.

7. The method of claim 1, wherein the common factor comprises a shared attack type, attack vector, or behavioral characteristic associated with the cyber-attacks targeting the accounts.

8. The method of claim 1, wherein the subset of accounts is identified based on the CAI of each account relative to CAI values of other accounts.

9. The method of claim 1, wherein the cybersecurity prevention action is selected based on the common factor indicative of susceptibility to the cyber-attack.

10. The method of claim 1, wherein the cybersecurity prevention action comprises applying a same security control to each account in the group.

11. A system for reducing cybersecurity risk to an organization, comprising:

at least one electronic processor;

an electronic non-transitory data storage element including a set of computer-executable instructions that, when executed by the electronic processor, cause the system to identify multiple accounts on a cloud-based platform that have been targeted by a cyber-attack;

for each account of the multiple accounts:

identify each cyber-attack targeting the account;

determine a type of attack for each cyber-attack;

assign a severity measure for the determined type of attack;

determine a confidence measure in correct identification of the type of attack;

generate a weighting term for each cyber-attack based on the severity measure and the confidence measure; and combine the weighting terms to obtain a cloud attack index (CAI) for the account;

based on the CAI for the multiple accounts, identify a subset of the accounts as a group that contribute more to overall cybersecurity risk and that share a common factor indicative of susceptibility to a cyber-attack;

determine a cybersecurity prevention action associated with the common factor;

receive a user input selecting the cybersecurity prevention action for the group; and apply the selected cybersecurity prevention action to each account of the group.

12. The system of claim 11, wherein the type of attack is one of an Advanced Persistence Threat, a Lateral movement attack, a Collaboration attack, Cloud Phishing, a Brute-force attack, or a Cloud Phishing Speculative attack.

13. The system of claim 11, wherein the weighting term for each cyber-attack is a product of the severity measure for the type of attack and the confidence measure in the correct identification of the type of attack.

14. The system of claim 11, wherein the display enables a security analyst to examine a sum of the weighting terms for an individual account, for different groups of accounts, or for an organization.

15. The system of claim 14, wherein the display further enables the security analyst to examine the sum of the weighting terms as a function of time between dates of interest or for accounts having a specified characteristic.

16. The system of claim 11, wherein the cybersecurity prevention action is suspending each account of the group for a period of time, requiring use of multi-factor authentication for each account of the group, or requiring each user of each account of the group to participate in security training relating to identity protection.

17. One or more non-transitory computer-readable media comprising a set of computer-executable instructions that when executed by one or more programmed electronic processors, cause the processors or a device or apparatus in which they are contained to:

identify multiple accounts on a cloud-based platform that have been targeted by a cyber-attack;

for each account of the multiple accounts:

identify each cyber-attack targeting the account;

determine a type of attack for each cyber-attack;

assign a severity measure for the determined type of attack;

determine a confidence measure in correct identification of the type of attack;

generate a weighting term for each cyber-attack based on the severity measure and the confidence measure; and combine the weighting terms to obtain a cloud attack index (CAI) for the account;

based on the CAI for the multiple accounts, identify a subset of the accounts as a group that contribute more to overall cybersecurity risk and that share a common factor indicative of susceptibility to a cyber-attack:

determine a cybersecurity prevention action associated with the common factor;

receive a user input selecting the cybersecurity prevention action for the group; and apply the selected cybersecurity prevention action to each account of the group.

18. The one or more non-transitory computer-readable media of claim 17, wherein the type of attack is one of an Advanced Persistence Threat, a Lateral movement attack, a Collaboration attack, Cloud Phishing, a Brute-force attack, or a Cloud Phishing Speculative attack.

19. The one or more non-transitory computer-readable media of claim 17, wherein the weighting term for each cyber-attack is a product of the severity measure for the type of attack and the confidence measure in the correct identification of the type of attack.

20. The one or more non-transitory computer-readable media of claim 17, wherein the instructions further cause the processors to identify the group of the multiple accounts that have more contribution to the risk using machine learning to determine a factor that each of the accounts in the group have in common that indicates a susceptibility to being a target or to a cyber-attack being successful.

* * * * *